(12) United States Patent
Lee et al.

(10) Patent No.: US 10,866,668 B2
(45) Date of Patent: Dec. 15, 2020

(54) DISPLAY DEVICE AND CONTROL METHOD THEREFOR

(71) Applicant: LG ELECTRONICS INC., Seoul (KR)

(72) Inventors: Jungbin Lee, Seoul (KR); Yonjae Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/340,659

(22) PCT Filed: Oct. 19, 2016

(86) PCT No.: PCT/KR2016/011742
§ 371 (c)(1),
(2) Date: Apr. 9, 2019

(87) PCT Pub. No.: WO2018/070579
PCT Pub. Date: Apr. 19, 2018

(65) Prior Publication Data
US 2020/0050308 A1 Feb. 13, 2020

(30) Foreign Application Priority Data

Oct. 13, 2016 (KR) ........................ 10-2016-0132987

(51) Int. Cl.
| G06F 3/041 | (2006.01) |
| G06F 3/0354 | (2013.01) |
| G06F 3/038 | (2013.01) |
| G06F 3/0486 | (2013.01) |
| G06F 3/0488 | (2013.01) |

(Continued)

(52) U.S. Cl.
CPC ............ *G06F 3/0412* (2013.01); *G06F 3/038* (2013.01); *G06F 3/0354* (2013.01); *G06F 3/0486* (2013.01); *G06F 3/0488* (2013.01); *G06F 3/14* (2013.01); *H04N 5/93* (2013.01)

(58) Field of Classification Search
None
See application file for complete search history.

(56) References Cited

U.S. PATENT DOCUMENTS

2012/0290966 A1* 11/2012 Chae .................... G06F 3/0481
715/778
2013/0187861 A1* 7/2013 Lavallee ................ G06F 9/543
345/173

(Continued)

FOREIGN PATENT DOCUMENTS

| KR | 10-2011-0063409 A | 6/2011 |
| KR | 10-2015-0026424 A | 3/2015 |
| KR | 10-2015-0045121 A | 4/2015 |

*Primary Examiner* — Christopher R Lamb
(74) *Attorney, Agent, or Firm* — Birch, Stewart, Kolasch & Birch, LLP

(57) ABSTRACT

The present invention relates to a display device and a control method therefor and, more specifically, provides a display device comprising: a sensing unit for sensing a touch pen; a touchscreen; and a control unit, wherein the control unit controls at least one of a plurality of pieces of content on the basis of a position of the touch pen in a state of executing a multi-tasking mode in which the plurality of pieces of content is simultaneously being executed on the touchscreen, the plurality of pieces of content including note content.

14 Claims, 17 Drawing Sheets

(51) Int. Cl.
*G06F 3/14* (2006.01)
*H04N 5/93* (2006.01)

(56) References Cited

U.S. PATENT DOCUMENTS

| | | | |
|---|---|---|---|
| 2014/0055427 A1* | 2/2014 | Kim | G06F 3/03545 |
| | | | 345/179 |
| 2014/0253464 A1 | 9/2014 | Hicks et al. | |
| 2015/0002457 A1* | 1/2015 | Woo | G06F 3/0416 |
| | | | 345/174 |
| 2016/0054811 A1 | 2/2016 | Geller et al. | |
| 2016/0210041 A1* | 7/2016 | Yang | G06F 3/04886 |
| 2016/0239203 A1* | 8/2016 | Sato | H04M 1/0202 |
| 2017/0139500 A1* | 5/2017 | Large | G06F 3/044 |

* cited by examiner (a)

(b)

(c)

(a)

(b)

DISPLAY DEVICE AND CONTROL METHOD THEREFOR

CROSS REFERENCE TO RELATED APPLICATIONS

This application is the National Phase of PCT International Application No. PCT/KR2016/011742, filed on Oct. 19, 2016, which claims priority under 35 U.S.C. 119(a) to Patent Application No. 10-2016-0132987, filed in the Republic of Korea on Oct. 13, 2016, all of which are hereby expressly incorporated by reference into the present application.

TECHNICAL FIELD

The present invention relates to a display device and a control method therefor. More particularly, the present invention relates to a display device for controlling at least one of a plurality of content items based on a position of a touch pen while a multitasking mode is executed, and a control method therefor.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

As functions of the terminal are getting diversified, the terminal tends to be implemented as a multimedia player provided with complex functions such as photographing of photos or videos, playback of music or video files, game play, broadcast reception and the like for example.

Efforts are ongoing to support and increase the functionality of mobile terminals. Such efforts include software and hardware improvements, as well as changes and improvements in the structural components.

In addition, as the touchscreen of a mobile terminal becomes larger, and applications that receive inputs that the user provides by directly writing characters or drawing a picture by hand as well as simply pressing buttons are increased, a touch pen is used as an accessory of the mobile terminal for feeling of an actual pen.

DISCLOSURE

Technical Problem

The present invention is directed to solving the above-mentioned problems and other problems. An object of the present invention is to provide a display device for controlling at least one of a plurality of content items based on a position of a touch pen while a multitasking mode is executed, and a control method therefor.

Technical Solution

The object of the present invention can be achieved by providing a display device including a sensing unit configured to sense a touch pen, a touchscreen, and a controller configured to in a state that a multitasking mode in which a plurality of content items is concurrently executed on the touchscreen is executed, control at least one of the plurality of content items based on a position of the touch pen, the plurality of content items comprising a note content item.

According to an embodiment of the present invention, the controller may sense positions of a first pen tip and a second pen tip of the touch pen through the sensing unit.

According to an embodiment of the present invention, while the note content item and a first content item are executed in the multitasking mode, the controller may perform a control operation to output the note content item in a first area of the touchscreen and the first content item in a second area of the touchscreen.

According to an embodiment of the present invention, the controller may determine positions of the first area and the second area based on the sensed positions of the first pen tip and the second pen tip of the touch pen.

According to an embodiment of the present invention, the controller may determine a content item being active on the touchscreen, and execute the multitasking mode based on the determined content item and a first input signal of the touch pen.

According to an embodiment of the present invention, the first input signal may be an input signal of a touch-drag from a first point to a second point in a bezel portion of the display device.

According to an embodiment of the present invention, the active content item may be a video content item being reproduced.

According to an embodiment of the present invention, when the controller senses that a vertical distance from a top of the touchscreen to the first pen tip is equal to a vertical distance from the top of the touchscreen to the second pen tip, the controller may determine that the touch pen is in an idle mode.

According to an embodiment of the present invention, the controller may perform a control operation to stop reproducing the video content item as the touch pen is sensed on the video content item in the idle mode.

According to an embodiment of the present invention, when the touch pen is sensed on the note content item in the idle mode, the controller may scan an image of the video content item being reproduced and output the scanned image on the note content item.

According to an embodiment of the present invention, when the touch pen is sensed on the video content item and the note content item in the idle mode at the same time, the controller may switch the touchscreen to an inactive mode.

According to an embodiment of the present invention, when the touch pen is sensed in a preset hovering area of the display device for a preset time or longer, the controller may terminate the multitasking mode and output the video content item on the touchscreen in a full screen mode.

According to another embodiment of the present invention, when the controller senses a preset image output on the video content item, the controller may perform a control operation to stop reproducing the video content item.

According to an embodiment of the present invention, when the controller senses preset sound output on the video content item, the controller may perform a control operation to adjust a reproduction speed of the video content item to a lower speed.

According to an embodiment of the present invention, when no sound is output on the video content item, the controller may perform a control operation to adjust a reproduction speed of the video content item to a higher speed.

According to an embodiment of the present invention, the controller may output an indicator for changing positions of the first area and the second area.

According to an embodiment of the present invention, the controller may perform a control operation to change a template of the note content item according to the determined active content.

According to an embodiment of the present invention, when the image of the video content item is scanned and output on the note content item, a reproduction point of time of the video content item being reproduced may be mapped to the image and stored.

According to an embodiment of the present invention, paper feel coating may be applied to one area of a top of the touchscreen.

In another aspect of the present invention, provided herein is a method for controlling a display device, including executing a multitasking mode in which a plurality of content items are concurrently executed on a touchscreen; sensing a position of a touch pen; and controlling at least one of the plurality of content items based on the position of the touch pen, wherein the plurality of content items comprises a note content item.

Advantageous Effects

Effects of the display device and the control method therefor according to the present invention will be described below.

According to at least one embodiment of the present invention, when the multitasking mode is executed, at least one content item may be controlled based on the position of a touch pen.

In addition, according to at least one embodiment of the present invention, an automatic writing mode may be used by linking an active content item with a note content item based on the position of the touch pen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
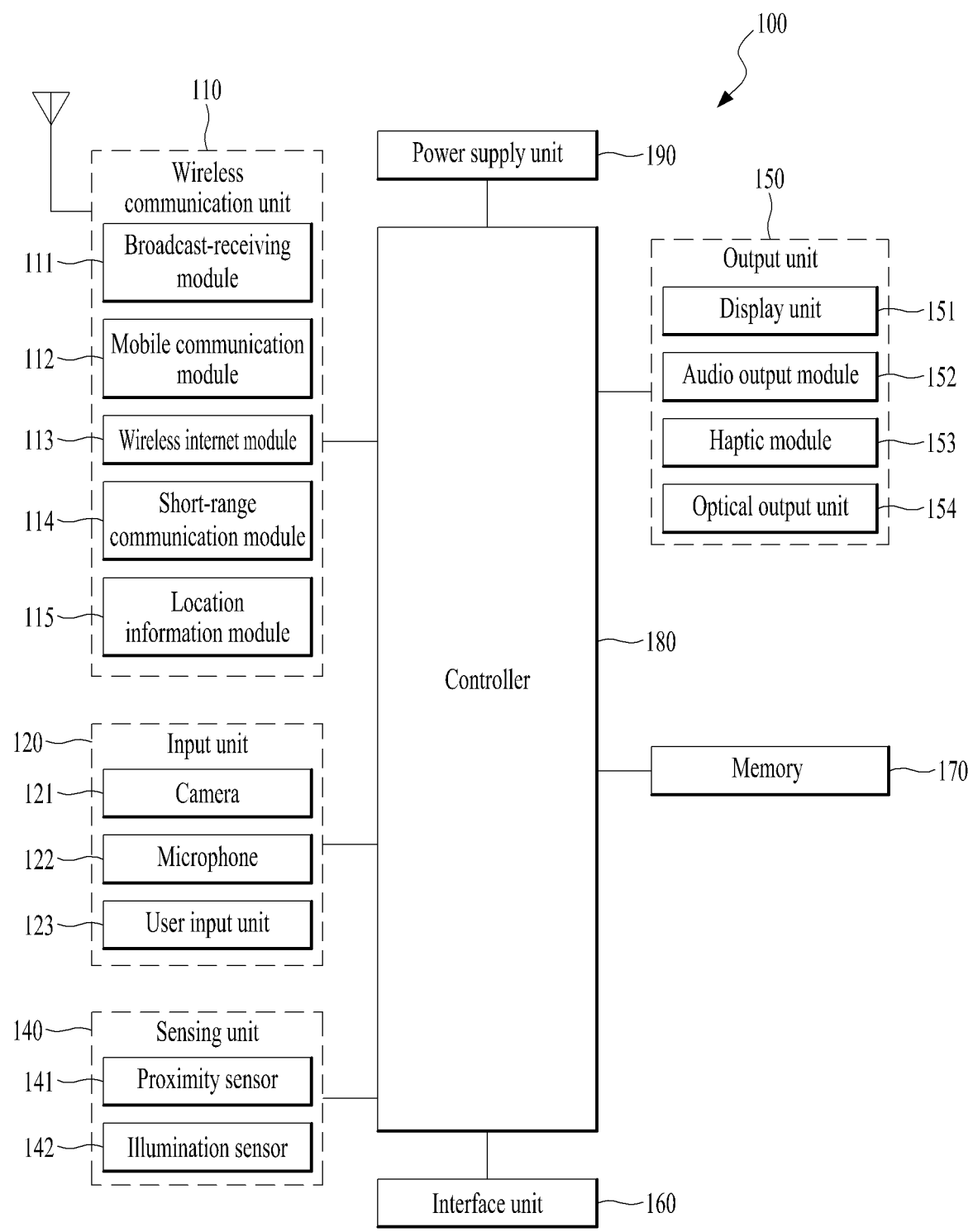
FIG. 1A is a block diagram of a mobile terminal in accordance with the present disclosure.
Figure 1B:
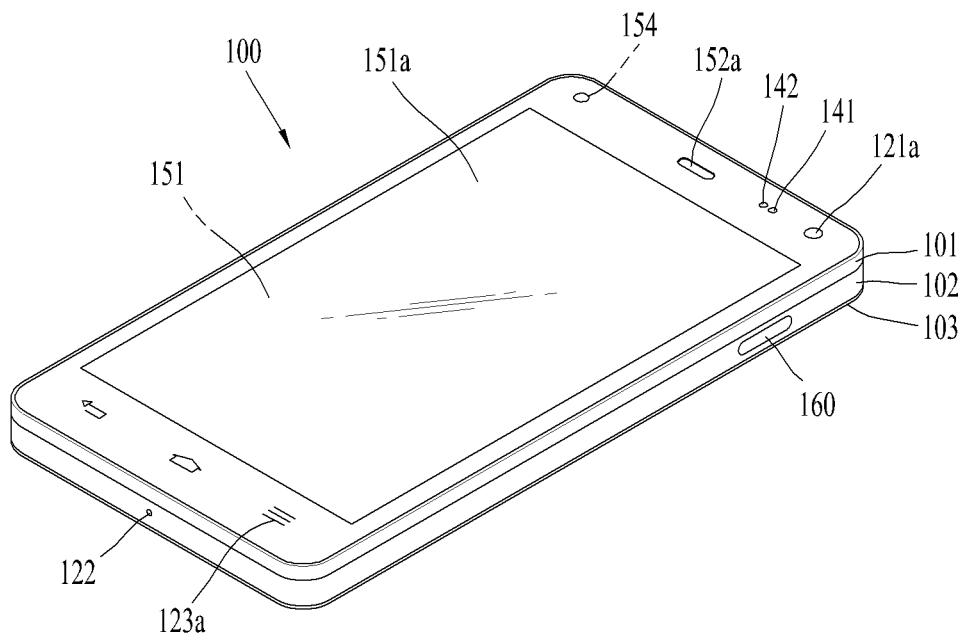
FIGS. 1B and 1C are conceptual views of one example of the mobile terminal, viewed from different directions.
Figure 1C:
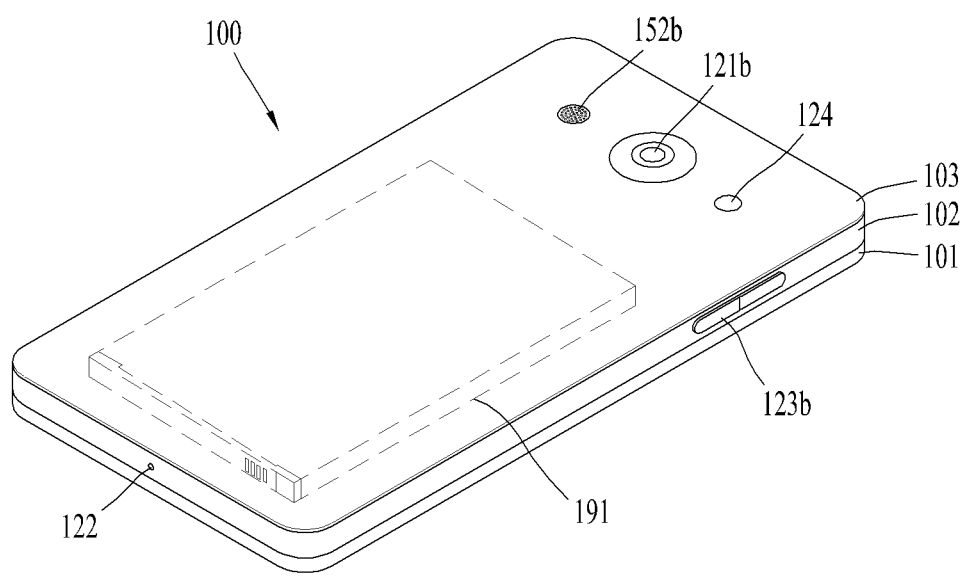

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display 151, the 1st audio output unit 152a, the 2nd audio output unit 152b, the proximity sensor 141, the illumination sensor 142, the optical output unit 154, the 1st camera 121a, the 2nd camera 121b, the 1st manipulating unit 123a, the 2nd manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
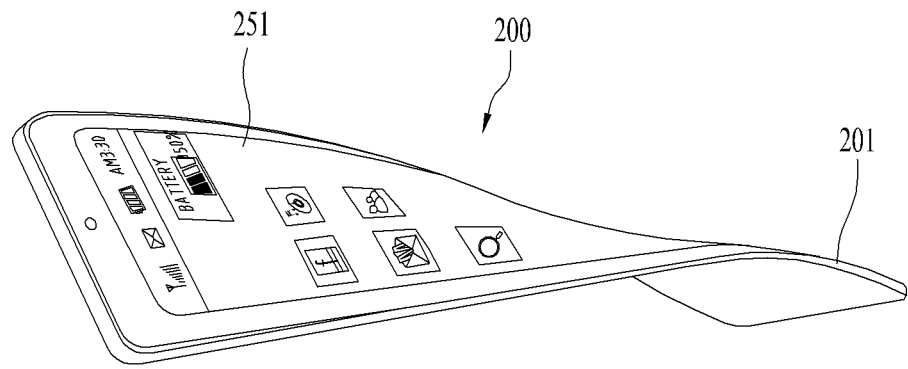
FIG. 2 is a conceptual diagram to describe another example of a deformable mobile terminal 200 according to the present disclosure.

FIG. 2 is a conceptual diagram to describe another example of a deformable mobile terminal 200 according to the present disclosure.

In this figure, mobile terminal 200 is shown having display unit 20, which is a type of display that is deformable by an external force. This deformation, which includes display unit 20 and other components of mobile terminal 200, may include any of curving, bending, folding, twisting, rolling, and combinations thereof. The deformable display unit 20 may also be referred to as a "flexible display unit." In some implementations, the flexible display unit 20 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 20 is not deformed (for example, in a state with an infinite radius of curvature and referred to as a first state), a display region of the flexible display unit 20 includes a generally flat surface. When in a state that the flexible display unit 20 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 20 may be a curved state (for example, a state of being curved from up to down or from right to left), instead of being in flat state. In this embodiment, when an external force is applied to the flexible display unit 20, the flexible display unit 20 may transition to the second state such that the flexible display unit is deformed into the flat state (or a less curved state) or into a more curved state.

If desired, the flexible display unit 20 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 20. The deformation sensor may be included in the sensing unit 140.

The deformation sensor may be located in the flexible display unit 20 or the case 201 to sense information related to the deforming of the flexible display unit 20. Examples of such information related to the deforming of the flexible display unit 20 may be a deformed direction, a deformed degree, a deformed position, a deformed amount of time, an acceleration that the deformed flexible display unit 20 is restored, and the like. Other possibilities include most any type of information which can be sensed in response to the curving of the flexible display unit or sensed while the flexible display unit 20 is transitioning into, or existing in, the first and second states.

In some embodiments, the controller 180 or other component can change information displayed on the flexible display unit 20, or generate a control signal for controlling a function of the mobile terminal 200, based on the information related to the deforming of the flexible display unit 20. Such information is typically sensed by the deformation sensor.

The mobile terminal 200 is shown having a case 10 for accommodating the flexible display unit 20. The case 10 can be deformable together with the flexible display unit 20, taking into account the characteristics of the flexible display unit 20.

A battery (not shown in this figure) located in the mobile terminal 200 may also be deformable in cooperation with the flexible display unit 20, taking into account the characteristic of the flexible display unit 20. One technique to implement such a battery is to use a stack and folding method of stacking battery cells.

The deformation of the flexible display unit 20 not limited to perform by an external force. For example, the flexible display unit 20 can be deformed into the second state from the first state by a user command, application command, or the like.

Meanwhile, beyond using a mobile terminal grabbed with a user's hand, the mobile terminal may extend to a wearable device that is wearable on a user body. Examples of the wearable device include a smart watch, a smart glass, a head mounted display (HMD), and the like. Examples of the mobile terminal extending to the wearable devices shall be described as follows.

A wearable device can exchange data with (or interwork with) another mobile terminal 100. The short-range communication module 114 can sense or recognize a nearby wearable device capable of communicating with the mobile terminal 100. Moreover, if the sensed wearable device is a device authenticated to communicate with the mobile terminal 100, the controller 180 may transmit at least one portion of the data processed in the mobile terminal 100 to the wearable device via the short-range communication module 114, for example. Hence, a user can use the data processed in the mobile terminal 100 through the wearable device. For example, when an incoming call is received by the mobile terminal 100, the user can answer the incoming call through the wearable device. When a message is received by the mobile terminal 100, the user can check the received message through the wearable device.

Figure 3:
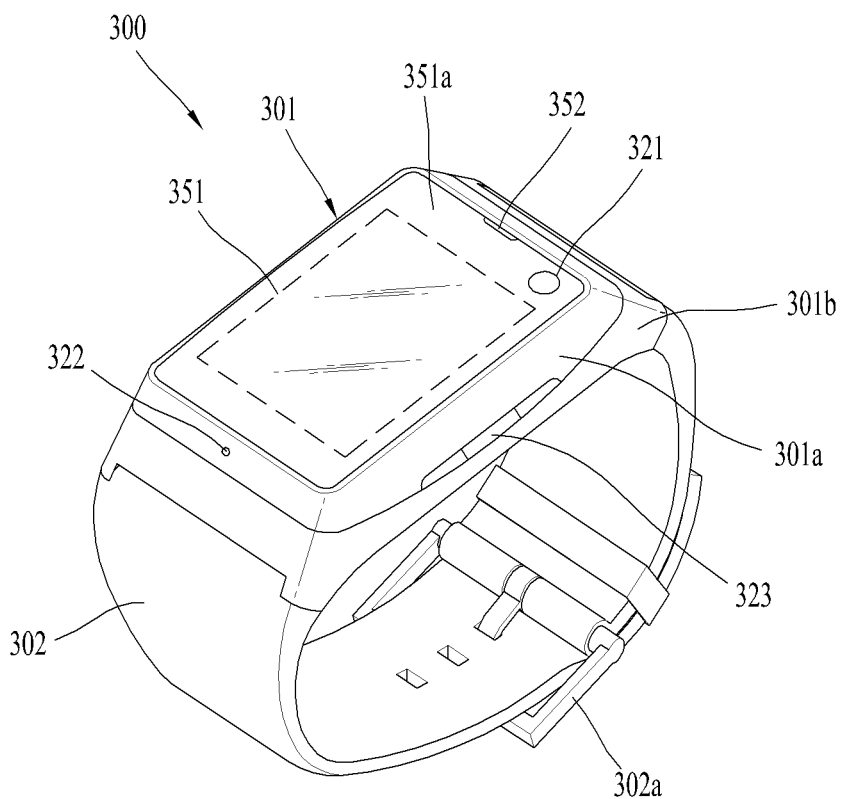
FIG. 3 is a perspective diagram for one example of a watch type mobile terminal 300 related to another embodiment of the present invention.

FIG. 3 is a perspective diagram for one example of a watch type mobile terminal 300 related to another embodiment of the present invention.

Referring to FIG. 3, a mobile terminal 300 of a watch type may include a main body 301 having a display unit 351 and a band 302 connected to the main body 301 to be wearable on a wrist. In general, the mobile terminal 300 may be configured to include features that are the same or similar to those of the former mobile terminal 100 shown in FIGS. 1A to 1C.

The main body 301 may include a case forming a certain appearance or exterior. As illustrated, the case may include a 1st case 301a and a 2nd case 301b configured to cooperatively provide an inner space for accommodating various electronic components therein, by which the present invention is non-limited. For instance, a single case is configured to provide the inner space, thereby embodying the mobile terminal 300 of a uni-body type.

The watch type mobile terminal 300 is configured to perform wireless communication, and an antenna for the wireless communication can be installed in the main body 301. It is able to expand performance of the antenna using the case. For example, a case containing a conductive material is electrically connected to the antenna to extend a ground region or a radiation region.

The display unit 351 is disposed on the front side of the main body 301 so as to output information. The display unit 351 is provided with a touch sensor so as to be embodied into a touchscreen. As illustrated, a window 351a of the display unit 251 is mounted on the 1st case 301a to form a front surface of the terminal body together with the 1st case 301a.

The main body 301 may be provided with an audio output unit 352, a camera 321, a microphone 322, a user input unit 323 and the like. In case that the display unit 351 is embodiment into the touchscreen, it can function as a user input unit 323. Hence, a separate key may not be provided to the main body 301.

The band 302 is configured to be worn on a wrist by enclosing the wrist. And, the band 302 may be formed of a flexible material for facilitating the wearing of the device. As one example, the band 302 may be made of leather, rubber, silicon, synthetic resin, and/or the like. As the band 302 is configured detachable from the main body 301, the band 302 may be substituted with various types of bands according to a user's preference.

Meanwhile, the band 302 may be used to expand the performance of the antenna. For example, a ground extending portion (not shown in the drawing) for extending a ground region by being electrically connected to the antenna may be built in the band 302.

The band 302 may include a fastener 302a. The fastener 302a may be embodied into a buckle type, a snap-fit hook structure, a Velcro® type, and/or the like. The fastener 302a may include a retractile section or material. According to the example shown in the present drawing, the fastener 302a is embodied into the buckle type.

Figure 4:
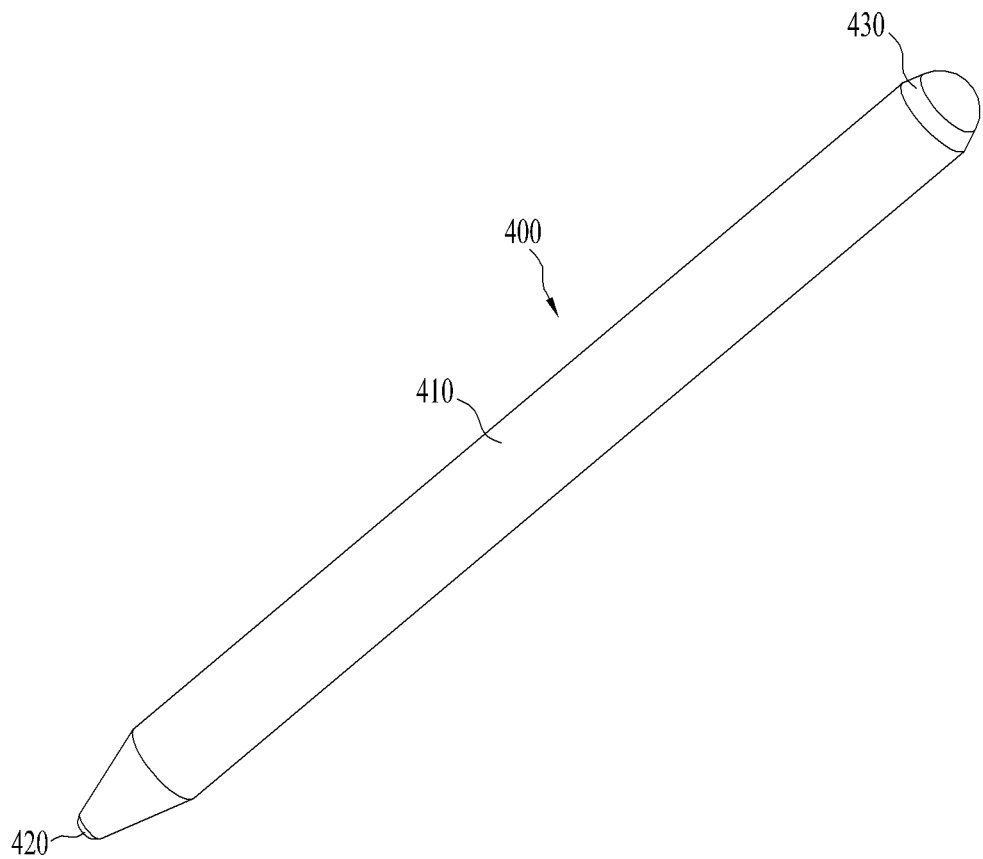
FIG. 4 is a perspective view of a touch pen according to an embodiment of the present invention.

FIG. 4 is a perspective view of a touch pen according to an embodiment of the present invention.

Referring to FIG. 4, a touch pen 400 is a tool used in place of a finger to input a command on a touchscreen of a mobile terminal, and includes a pen body 410 and pen tips 420 and 430.

The pen body 410 may be made of a pipe-shaped injection-molded product, which has an inside formed of a conductive material and includes a hollow therein. The injection-molded product is a structure made by injecting a liquefied synthetic resin into a mold and curing the resin in a desired shape. Since the manufacturing process for the product is simple, the product is advantageous for mass production. Further, since the product can be manufactured in any shape, the touch pen 400 of various shapes may be made using the product. In addition, the pen body 410 may be formed of a transparent material to allow the color of a conductive material therein to be seen.

The pen tips 420 and 430 may be electrically connected by being coupled with the conductive material of the pen body 410. That is, the pen tips 420 and 430 may be connected through the user's hand and the pen body 410 to exhibit the same effect as given when the user touches by hand. In addition, the pen tips 420 and 430 may be made of a conductive silicone material and formed to be soft or rigid.

In one embodiment of the present invention, the pen tips 420 and 430 may be recognized by a touch sensor when they contact a touchscreen in a capacitive touch manner. Here, when the sensitivity of the touch sensor of the touchscreen increases, that is, when the touch sensor can sense a touch on in a smaller touch area, the hardness of the pen tips 420 and 430 may be increased. In addition, the contact area may be changed according to the pressure and the pen body 410 in contacting the touchscreen of the mobile terminal. More specifically, since the change in capacitance input from to the touchscreen from the pen tips 420 and 430 differs according to the contact area, two or more different commands may be input through one pen tip.

The pen tips 420 and 430 may be provided to an upper and lower portions of the pen body 410, respectively. Generally, a first pen tip 420 used to write characters or the like in contact with the touchscreen may be provided to the lower portion of the pen body 410, and a second pen tip 430 used to erase a written text may be provided to the upper portion of the pen body 410.

It should be noted that the touch pen 400 shown in FIG. 4 may be implemented as a touch pen that is usually commercially available in pair with a mobile terminal.

Hereinafter, embodiments related to a control method that may be implemented in the mobile terminal and the touch pen configured as described above will be described with reference to the accompanying drawings. It will be apparent to those skilled in the art that the present invention may be embodied in other specific forms without departing from the spirit or essential characteristics thereof.

A display device described below with reference to FIGS. 5 to 18 may be implemented as one of the mobile terminals 100, 200 and 300 shown in FIGS. 1 to 3, and a touch pen may be implemented as the touch pen 400 shown in FIG. 4. That is, the display device described below may be construed as one of the mobile terminals described above.

Hereinafter, embodiments of the present invention will be described with reference to FIGS. 5 to 18. In the following, in describing and understanding embodiments of the present invention, reference may be made to the description given above in relation to FIGS. 1 to 4.

Figure 5:
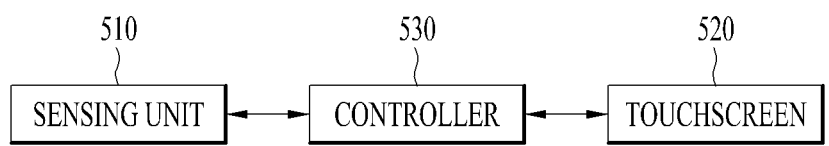
FIG. 5 is a block diagram illustrating component modules of a display device according to an embodiment of the present invention.

FIG. 5 is a block diagram illustrating component modules of a display device according to an embodiment of the present invention.

Referring to FIG. 5, a display device according to the embodiment of the present invention may include a sensing unit 510, a touchscreen 520, and a controller 530. Here, the sensing unit 510, the touchscreen 520, and the controller 530 may be implemented as the sensing unit 140, the display unit 151, and the controller 180 listed in FIG. 1A, respectively.

The sensing unit 510 may sense information in the display device and information about an environment surrounding the display device. In an embodiment of the present invention, the sensing unit 510 may sense the position of the touch pen while the touch pen is not in contact with the touchscreen and also sense a specific portion thereof that contacts the touchscreen.

More specifically, the sensing unit 510 may sense a touch pen that is approaching or present in proximity to a predetermined detection surface (e.g., the touchscreen) without a mechanical contact with the touch pen. Since the sensing unit 510 includes a proximity sensor, the sensing unit may be configured to detect the proximity of the touch pen by the change in electric field according to the proximity of the touch pen, which has conductivity. Here, the touchscreen may include the proximity sensor. A detailed description of areas in which the touch pen is sensed in the display device will be given later with reference to FIG. 6 (Sensing the touch pen in a hovering area).

In addition, the sensing unit 510 may be provided in the touchscreen 520 to sense various touch input signals. More specifically, the sensing unit 510 sense pressure applied to the sensing unit 510 or change in capacitance or the like occurring at a specific portion, using at least one of various touch techniques such as resistive touch, capacitive touch, and infrared touch. That is, the sensing unit 510 may convert a change in voltage, the amount of charge, or the like occurring at a specific portion receiving an input from the touch pen, into an electrical input signal.

In the present invention, the sensing unit 510 may distinguish between touching the touchscreen 520 with a finger and touching the touchscreen 520 with the touch pen. In addition, when the touch pen 520 touches the touchscreen 520, the sensing unit 510 may not recognize a touch of the palm of a hand as a touch input even if the touchscreen is touched by the palm. For example, when a user writes a text on the touchscreen 520 using the touch pen, a part of the palm may contact the touchscreen 520 due to the user's habit. In this case, the sensing unit 520 may distinguish the input signal of the touch pen input to the touchscreen 520 from the input signal of the part of the palm and sense only the input signal of the touch pen as a valid input signal (Palm rejection).

In one embodiment of the present invention, the sensing unit 510 may distinguish between the first pen tip and the second pen tip of the touch pen in sensing the touch pen. Accordingly, the display device may assign different functions to the first pen tip and the second pen tip, which are sensed through the sensing unit 510 (Different functions for the front/back).

In one embodiment of the present invention, the sensing unit 510 may sense the positions of the first pen tip and the second pen tip of the touch pen. For example, the sensing unit 510 may sense that the first pen tip, which corresponds to the lower part of the touch pen, is located in a first area of the touchscreen, and the second pen tip, which corresponds to the upper part of the touch pen, is located in a second area of the touchscreen. This operation will be described in detail with reference to FIG. 7 (Determination of left/right hands based on the front/back positions)

The touchscreen 520 may display visual information. Here, the visual information may include a text, an indicator, an icons, a content item, an application, an image, and a video. Further, the touchscreen 520 may output the visual information on the screen based on a control command of the controller 530.

Further, in one embodiment of the present invention, the touchscreen 520 may be coated with a paper feel film. In this case, a film may not be attached to the top of the touchscreen 520, but a paper feel coating may be implemented on the touchscreen 520. Of course, the paper fill coating may be applied to only a portion of the top of the touchscreen 520, rather than to the entire area thereof. Accordingly, when the user writes on the touchscreen 520 with the touch pen, the user may experience a feeling of handwriting like writing on actual paper. In addition, when the coating is applied to only a portion of the touchscreen 520, different UIs/UXs may be employed for the uncoated area and the coated area (paper feel coating).

In the present invention, the touchscreen 520 may execute a multitasking mode in which a first content item is output in the first area, and the note content item is output in the second area, based on the input signal of the touch pen. Details will be described with reference to FIGS. 7 and 8.

The controller 530 may process data, control the individual units of the mobile terminal described above, and control data transmission/reception between the units.

In one embodiment of the present invention, operations performed by the mobile terminal may be controlled by the controller 530. For simplicity, in the drawings and the following description, these operations will be described as being executed/controlled by the mobile terminal.

Figure 6:
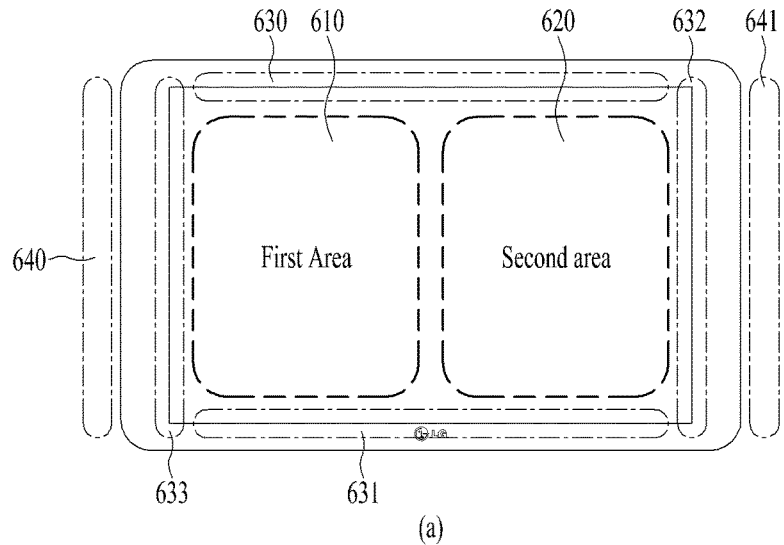
FIG. 6 is a view illustrating a hovering area of a display device according to an embodiment of the present invention.
Figure 6:
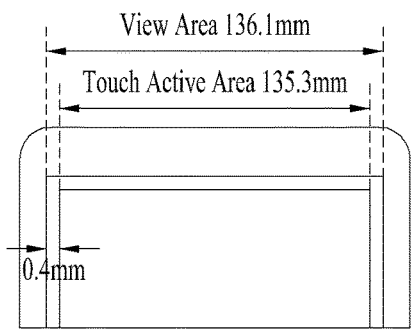
Figure 6:
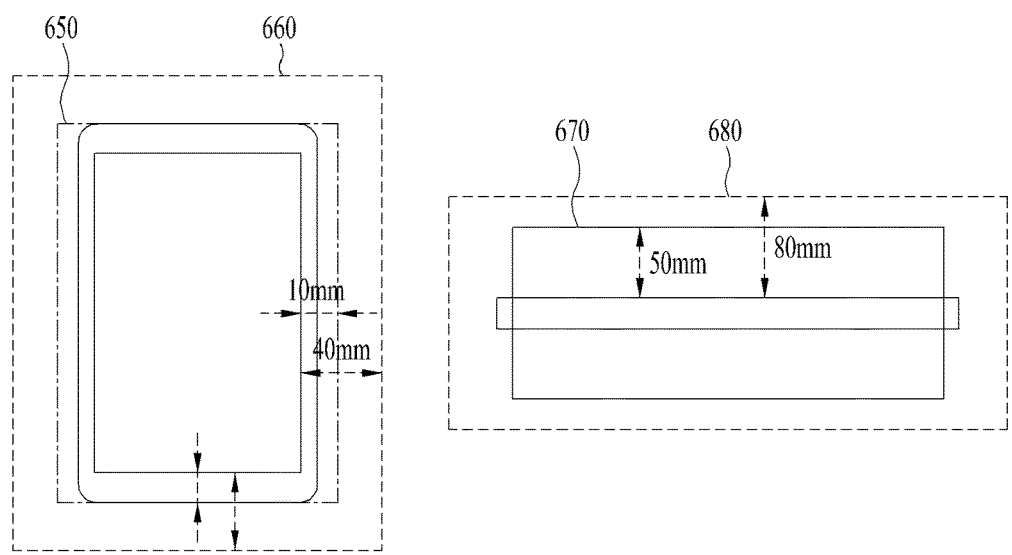

FIG. 6 is a view illustrating a hovering area of a display device according to an embodiment of the present invention. In the embodiment of FIG. 6, description of parts identical to those in FIG. 5 will be omitted.

Referring to FIG. 6(*a*), the display device may include not only an area within a touchscreen, but also various areas where the touch pen may be distinguishably sensed. More specifically, the display device may sense the touch pen in a first area 610, a second area 620, bezel areas 630, 631, 632, and 633, and hovering areas 640 and 641 of the touchscreen.

The first area 610 and the second area 620 of the touchscreen may correspond to default areas set in the display device as preset areas of the touchscreen or correspond to areas set by the user. For example, in the display device, the touchscreen may be divided into left and right areas by default to set a first area 610 as the left area and a second area 620 as the right area. In an embodiment of the present invention, the display device may distinguish whether the touch pen is sensed in the first area 610 or the second area 620.

The bezel areas 630, 631, 632, and 633 may correspond to touch areas adjacent to the upper, lower, left, and right bezel portions of the display device. The bezel portions may correspond to a front case portion of the main body of the display device except for the front touchscreen. In one embodiment of the present invention, the display device may recognize a touch operation of a swipe from the outside of the bezel portions to the inside of the touchscreen. Hereinafter, the bezel areas 630, 631, 632, and 633 will be described in detail with reference to FIG. 6(*b*).

Referring to FIG. 6(*b*), it may be assumed that the width of the touchscreen of the display device is 136.1 mm. Here, the touchscreen may correspond to an area in which the content is output in the display device. It may also be assumed that the width of a touch-allowed area of the display device is 135.3 mm. Here, the touch-allowed area may correspond to an area where a touch input operation can be sensed by the above-described sensing unit in the touchscreen. That is, the bezel areas 630, 631, 632, and 633 may correspond to areas within a preset distance from a point located 0.4 mm inside the touchscreen.

Referring to the embodiments of FIGS. 6(*a*) and 6(*b*), the display device may recognize the touch operation of swiping from the bezel portion toward the touchscreen by 0.4 mm or more. In addition, the width of the bezel areas 630, 631, 632, and 633 may be differently set depending on hardware performance. That is, the above-mentioned values are illustrative, and the range of the bezel areas 630, 631, 632, and 633 may be increased according to a technical change.

The hovering areas 640 and 641 are outside the display device, and may correspond to areas where the sensing unit of the display device can sense the touch pen. Since the display device has a magnetic field sensor in the sensing unit, it may measure a three-dimensional position using a magnet mounted on the touch pen. The range of the hovering areas 640 and 641 may be differently set depending on hardware performance. Hereinafter, the hovering areas 640 and 641 will be described in detail with reference to FIG. 6(*c*).

The left part of FIG. 6(*c*) is a front view of the hovering areas 640 and 641 of the display device and the right part of FIG. 6(*c*) is a side view of the hovering areas 640 and 641 of the display device. In one embodiment of the present invention, the hovering areas 640 and 641 may include optimal hovering areas 650 and 670 and simple hovering areas 660 and 680, which will be described in detail later.

Referring to the left part of FIG. 6(*c*), when the display device is viewed from the front, an area spanning 10 mm from the upper, lower, left, and right edges of the touchscreen may be set as an optimal hovering area 650. In the optimal hovering area 650, the three-dimensional position of the touch pen may be sensed even if the touch pen is not in contact with the touchscreen. In addition, in the optimal hovering area 650, not only the three-dimensional position of the touch pen but also the angle of the touch pen may be sensed.

In addition, the display device may set an area spanning 40 mm from the upper, lower, left and right edges of the touchscreen as a simple hovering area 660. Here, in the simple hovering area 660, the three-dimensional position of the touch pen may be sensed even if the touch pen does not touch the touchscreen. However, unlike in the optimal hovering area 650, the angle of the touch pen may not be sensed in the simple hovering area 660.

Referring to the right part of FIG. 6(*c*), when the display device is viewed from one side, an area spanning 50 mm from the top or bottom of the touchscreen may be set as an optimal hovering area 670. Further, in the display device an area spanning 80 mm from the top or bottom of the touchscreen may be set as a simple hovering area 680.

It is to be understood that all the above-mentioned values are illustrative and the ranges of the bezel areas and the hovering areas may be increased according to a technical change. In the following embodiments, the present invention will be described on the assumption that the display device is capable of sensing the touch pen by distinguishing among the first area, the second area, the bezel areas, and the hovering areas of the touchscreen.

Figure 7:
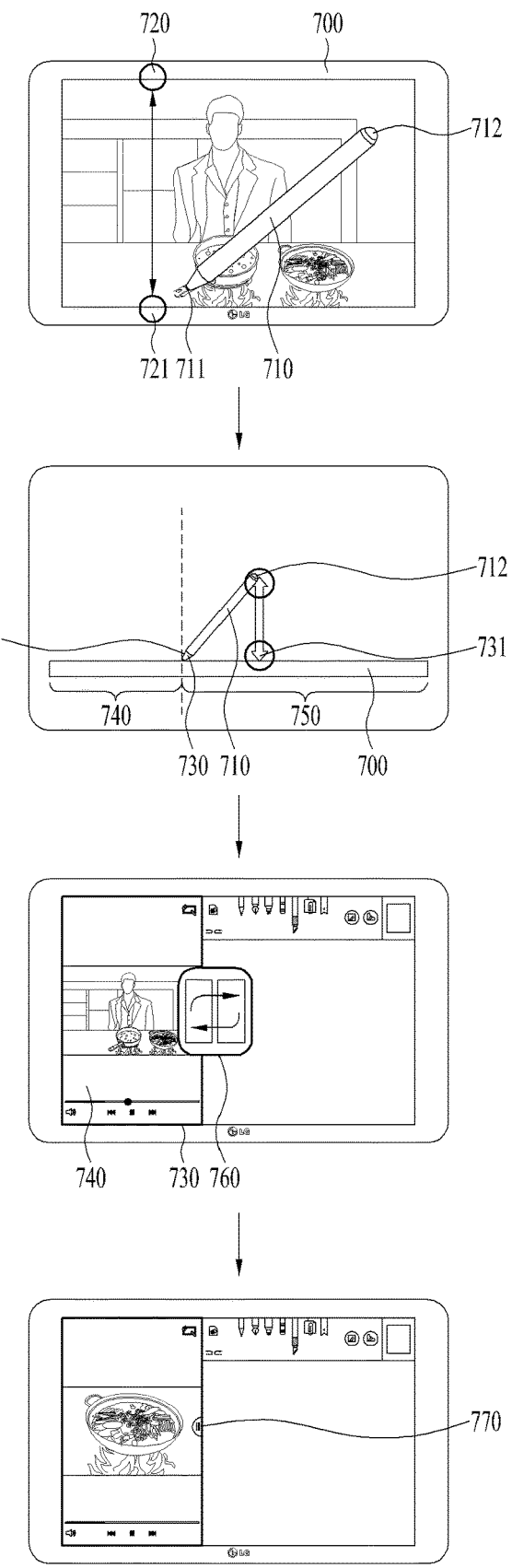
FIG. 7 is a view illustrating an example of determination of an area in which a note content item is output according to an embodiment of the present invention.

FIG. 7 is a view illustrating an example of determination of an area in which a note content item is output according to an embodiment of the present invention. In the embodiment of FIG. 7, description of parts identical to those in FIGS. 5 and 6 will be omitted.

Referring to the first part of FIG. 7, a multitasking mode may be executed in a display device 700 with a content item being activated on the touchscreen. Here, the multitasking mode may correspond to a mode in which a plurality of content items is concurrently executed on the touchscreen. In the embodiments of FIGS. 7 to 15, it is assumed that the active content item is video content. However, it is to be noted that this embodiment of the present invention is applicable to all content items executable in the display device 700.

More specifically, the display device 700 may sense a first input signal corresponding to a touch-drag of the touch pen 710 from a first point 720 to a second point 721 in the bezel portion with a video content item activated on the touchscreen. As the display device 700 senses the first input signal, the display device may output a plurality of content items on the touchscreen in the multitasking mode. Here, the plurality of content items may include a note content item. In addition, switching the display device 700 to the multitasking mode by executing the note content item may be regarded as switching the display device 700 to the writing mode.

That is, as the display device 700 senses the first input signal, it may execute the video content item and the note content item in the multitasking mode.

Hereinafter, an embodiment will be described, in which the video content item and the note content item are divided according to the positions of a first pen tip 711 and a second pen tip 712 of the touch pen 710, which are sensed by the display device 700, and output in a part of the area of the touchscreen.

The second part of FIG. 7 is a view illustrating the embodiment of the display device 700 and the touch pen 710 viewed from a side. Referring to the second part of FIG. 7, the display device 700 may sense a first point 730 where the first pen tip 711 touches the touchscreen. As the display device 700 senses the first point 730, it may divide the touchscreen into a first area 740 and a second area 750 on the basis of the first point 730. Here, the first area 740 may correspond to the left area of the display device 700, and the second area 750 may correspond to the right area of the display device 700.

In one embodiment of the present invention, the display device 700 may sense the three-dimensional position of the second pen tip 712. In addition, the display device 700 may determine a second point 731 on the touchscreen that vertically corresponds to the three-dimensional position of the second pen tip 712. The display device 700 may determine in which hand the user holds the touch pen 710, based on the first point 730 and the second point 731 on the touchscreen. For example, when the second point 731 is positioned on the right side of the first point 730, the display device 700 may determine that the user holds the touch pen 710 in his right hand. On the other hand, when the second point 731 is positioned on the left side of the first point 730, the display device 700 may determine that the user holds the touch pen 710 in his left hand. Hereinafter, it is assumed that the user holds the touch pen 710 in the right hand to use the touch pen.

Referring to the third part of FIG. 7, when it is determined that the user has input the first input signal, holding the touch pen 710 in his right hand, the display device 700 may output the video content item in the first area 740 and output the note content item in the second area 750.

In one embodiment of the present invention, after outputting the video content item and the note content item in the first area 740 and the second area 750, the display device 700 may output a position switch indicator 760 on the video content item and the note content item in an overlaying manner. Here, the position switch indicator 760 may correspond to an indicator for switching the position of the content item output in the first area 740 with the position of the content item output in the second area 750. That is, the display device 700 may automatically output the video content item and the note content item in the first area 740 and the second area 750 based on the positions of the first pen tip 711 and the second pen tip 712 of the touch pen 710. However, in view of the user, it may be more convenient when the content items are output in the opposite areas. In case that the display device 700 incorrectly senses the positions of the first pen tip 711 and the second pen tip 712, the user may use the position switch indicator 760.

Referring to the fourth part of FIG. 7, when no other input signal is sensed for a preset time after the position switch indicator 760 is output, the display device 700 may output the video content item in the first area 740 and the note content item in the second area 750. For example, if the user does not select the position switch indicator 760 within three seconds after the position switch indicator 760 is output, the display device 700 may output the video content item in the first area 740 and the note content item in the second area 750, considering that the user has agreed to the current setting.

In one embodiment of the present invention, when an input signal for selecting the position switch indicator 760 is sensed, the display device 700 may output the note content item in the first area 740 and the video content item in the second area 760.

Further, in one embodiment of the present invention, the display device 700 may adjust the size of the first area 740 using an area adjustment button 770. More specifically, the display device 700 may sense a touch input signal for dragging the area adjustment button 700. The display device 700 may set the size of the first area 740 based on the touch input signal for dragging the area adjustment button 700. For example, when the user touch-drags the area adjustment button 700 to the left, the display device 700 may reduce the size of the first area 740 to the degree of the touch-drag. In addition, when the user drags the area adjustment button 700 to the right, the display device 700 may increase the size of the first area 740 to the degree of the touch-drag.

Controlling Video Content Item Using Touch Pen in Idle Mode

The display device may control the view of the content item being output on the touchscreen according to the position of the touch pen with which notes are being taken down. For example, in the middle of the multitasking mode in which the video content item and the note content item are being output, the display device may stop reproduction of the video content item based on the position of the touch pen, or scan the image of the video content item and output the same on the note content item, switch the touchscreen to the inactive mode, or terminate the multitasking mode and output the video content item in a full screen mode. Hereinafter, an embodiment of controlling the multitasking mode in which the video content item and the note content item are executed using the touch pen in the idle mode will be described with reference to FIGS. 8 to 12.

Figure 8:
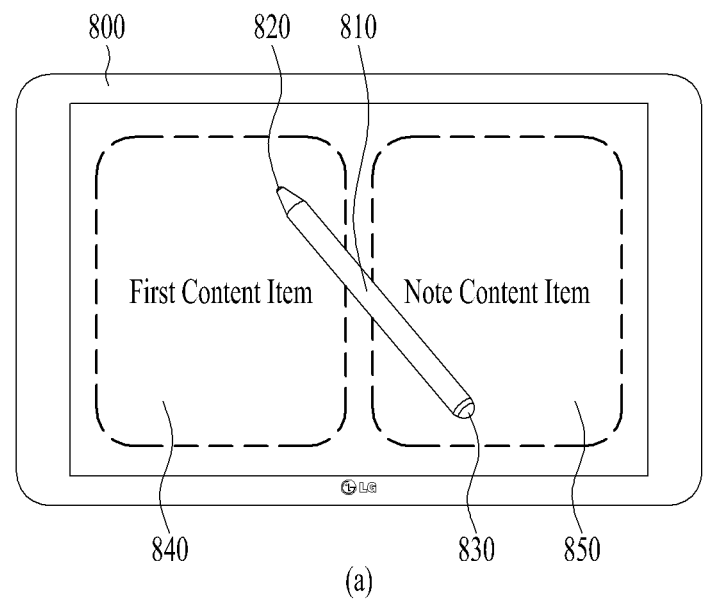
FIG. 8 illustrates an idle state of a touch pen according to an embodiment of the present invention.
Figure 8:
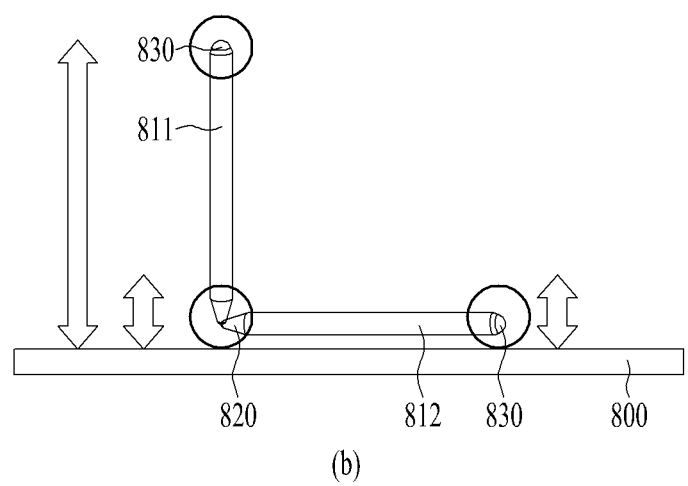

FIG. 8 illustrates an idle mode of a touch pen according to an embodiment of the present invention. In the embodiment of FIG. 8, description of parts identical to those in FIGS. 5 to 7 will be omitted.

FIG. 8(*a*) is a front view of a display device 800, and FIG. 8(*b*) is a side view of the display device 800.

In one embodiment of the present invention, the display device 800 may sense the position of a touch pen 810. In this operation, the display device 800 may distinguishably sense a first pen tip 820 located at a lower portion of the touch pen 810 and a second pen tip 830 located at an upper portion of the touch pen.

In other words, referring to FIG. 8(*a*), for example, the display device 800 may sense the first pen tip 820 of the touch pen 810 placed on a first area of the touchscreen in which a first content item 840 is output, and sense the second pen tip 830 of the touch pen 810 placed on a second area of the touchscreen in which a note content item 850 is output.

Referring to FIG. 8(*b*), for example, the display device 800 may sense a vertical distance between the first pen tip 820 and the top of the touchscreen and a vertical distance between the second pen tip 830 and the top of the touchscreen.

More specifically, in FIG. 8(*b*), when the touch pen 810 is positioned in a first state 811, the display device 800 may sense the distance from the first pen tip 820 of the touch pen 810 to the top of the touchscreen as a first distance, and sense the distance from the second pen tip 830 of the touch pen 810 to the top of the touchscreen as a second distance. In this case, when the touch pen 810 is positioned in the first state 811, the difference between the first distance and the second distance may correspond to a preset range or a wider range. In one embodiment of the present invention, the display device 800 may determine that the user is in the writing mode when the touch pen 810 is in the first state 811.

While FIG. 8(b) illustrates that the touch pen 810 as being vertically erected in the first state 811, the difference between the first distance and the second distance may correspond to a preset range or a wider range even when the touch pen 810 is inclined.

On the other hand, when the touch pen 810 is positioned in a second state 812 in FIG. 8(b), the display device 800 may sense the distance from the first pen tip 820 of the touch pen 810 to the top of the touchscreen 820 as a third distance, and sense the distance from the second pen tip 830 of the touch pen 810 to the top of the touchscreen as a fourth distance. In this case, when the touch pen 810 is positioned in the second state 812, the third distance may be equal to the fourth distance, or the difference between the third distance and the fourth distance may correspond to a preset range or a narrower range. That is, the display device 800 may determine that the user has laid down the touch pen 810 when the touch pen 810 is in the second state 812.

That is, the display device 800 may not only determine the areas of the touchscreen where the first pen tip 820 and the second pen tip 830 of the touch pen 810 are present as shown in FIG. 8(a), but also sense the vertical distances from the first pen tip 820 and the second pen tip 830 of the touch pen 810 to the top of the touchscreen as shown in FIG. 8(b).

Hereinafter, the touch pen 810 will be described as being in the idle mode when it is in the second state 812. That is, an embodiment will be described in which at least one of the first content item 840 and the note content item 850 is controlled differently depending on the position where the user lays down the touch pen 810.

Figure 9:
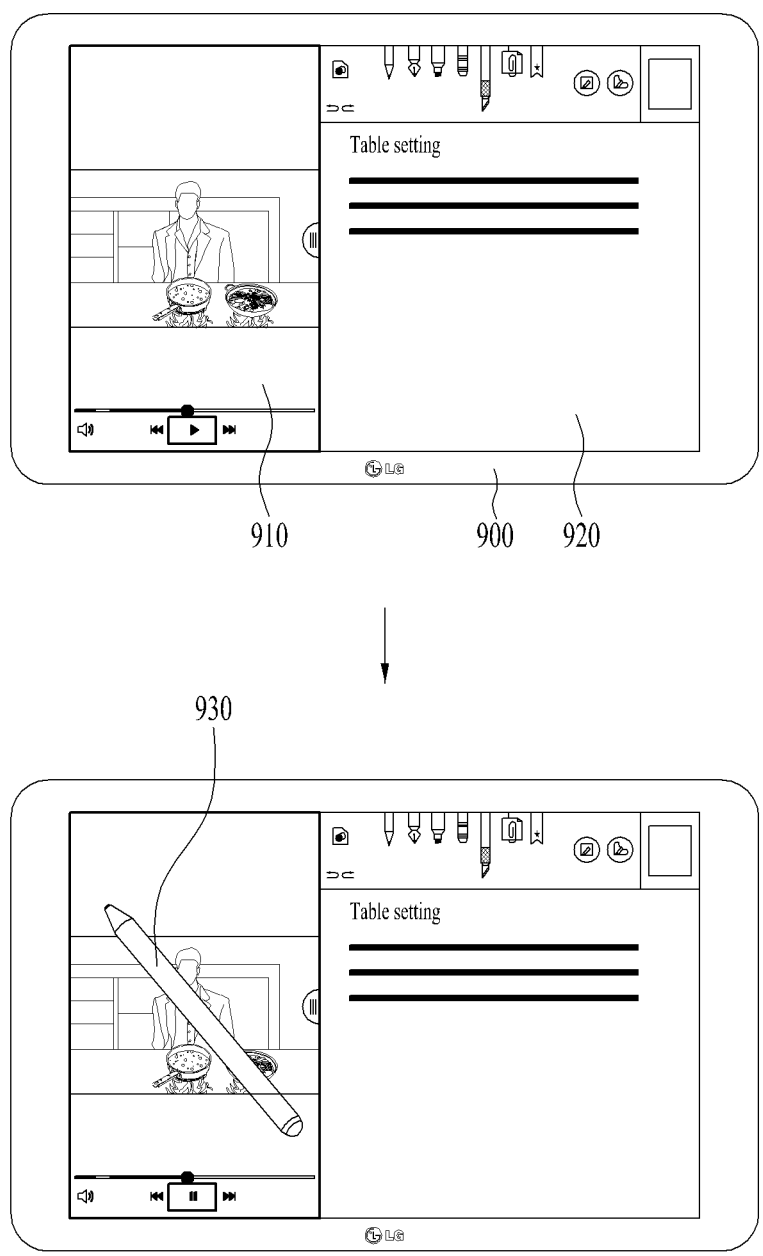
FIG. 9 is a view illustrating an embodiment in which reproduction of a video content item is stopped according to an embodiment of the present invention.

FIG. 9 is a view illustrating an embodiment in which reproduction of a video content item is stopped according to an embodiment of the present invention. In the embodiment of FIG. 9, the description of parts identical to those in FIGS. 5 to 8 will be omitted.

The first part of FIG. 9 illustrates a multitasking mode in which a video content item 910 is executed in the left area of the touchscreen and a note content item 920 is executed in the right area of the touchscreen according to the embodiment of FIG. 7. Here, the video content item 910 may correspond to a state in which the video content item is being reproduced.

Referring to the second part of FIG. 9, when the display device 900 senses the touch pen 930 being in the idle mode in the left area of the touchscreen, in which the video content item 910 is output, during reproduction of the video content item 910, it may perform a control operation to stop reproduction of the video content item 910. That is, when the first pen tip and the second pen tip of the touch pen 930 are both placed on the video content item 910, the display device 900 may determine that the user performs a certain operation rather than viewing the video content item.

In one embodiment of the present invention, when the display device 900 senses the touch pen 930 being released from the idle mode after it stops reproducing the video content item 910 as the touch pen 930 is sensed on the video content item 910 in the idle mode, it may resume reproducing the video content item 910. That is, the display device 900 may reproduce or stop the video content item 910 depending on whether the touch pen 930 is placed on the video content item 910 in the idle mode.

Figure 10:
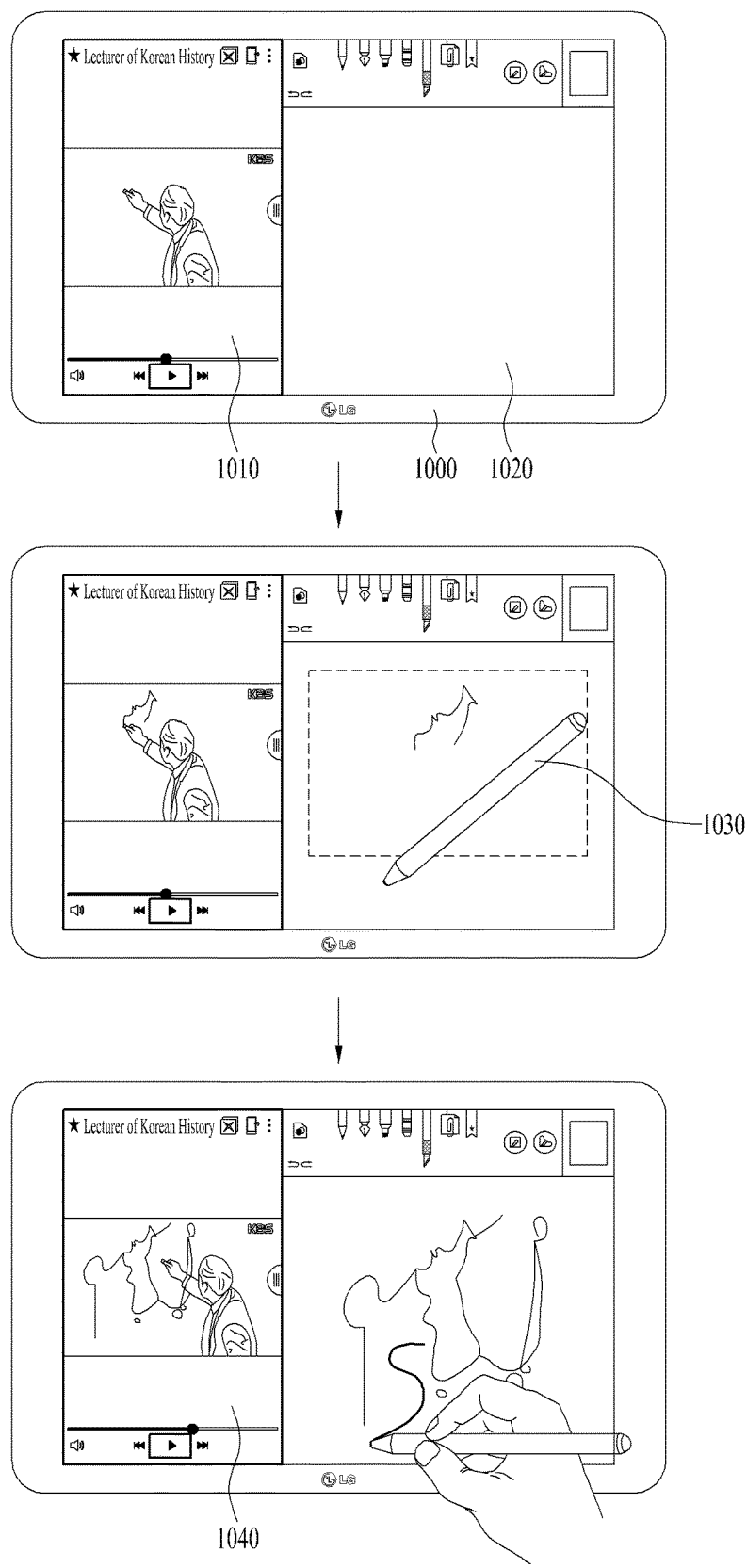
FIG. 10 is a view illustrating an embodiment in which an image of a video content item is automatically scanned to a note content item according to an embodiment of the present invention.

FIG. 10 is a view illustrating an embodiment in which an image of a video content item is automatically scanned onto a note content item according to an embodiment of the present invention. In the embodiment of FIG. 10, description of parts identical to those in FIGS. 5 to 9 will be omitted.

The first part of FIG. 10 illustrates a multitasking mode in which a video content item 1010 is executed in the left area of the touchscreen and a note content item 1020 is executed in the right area of the touchscreen as in the embodiment of FIG. 9. Here, the video content item 1010 may correspond to a state in which the video content item is being reproduced.

Referring to the second part of FIG. 10, when the touch pen 1030 is sensed in the right area of the touchscreen, in which the note content item 1020 is output, in the idle mode during reproduction of the video content item 1010, the display device 1000 may scan an image of the video content item 1010 being reproduced and output the scanned image on the note content item 1020. That is, when both the first pen tip and the second pen tip of the touch pen 1030 are placed on the note content item 1020, the display device 1000 may determine that the user has instructed switching to an "automatic writing mode."

More specifically, when the touch pen 1030 is sensed on the note content item 1020 in the idle mode, the display device 1000 may copy a still image output on the video content item 1010 and output the same on the note content item.

For example, when the video content item 1010 is a lecture video, the display device 1000 may copy a text, a map, a diagram, a table, a picture, and the like output in the lecture video and output the same on the note content item 1020.

In one embodiment of the present invention, when the still image output on the moving image content 1010 is scanned onto the note content item 1020, the display device 1000 may map the reproduction time point of the video content 1010 being reproduced to the scanned still image and store the same. Accordingly, the user may identify the still image scanned onto the note content item 1020 and the corresponding reproduction time of the video content item 1010.

In addition, in one embodiment of the present invention, when sound is not output (for example, sound is in a mute mode) during reproduction of the video content item 1010, the display device 1000 may adjust the reproduction speed of the video content item 1010 to a higher speed. Here, the reproduction speed may be preset by one of the display device 1000, the video content item 1010, and the user.

For example, when the video content item 1010 is a lecture video, the display device 1000 may adjust the reproduction speed of the video content item 1010 to 2 times speed to skip unnecessary content while the lecturer in the lecture video writes a text or draws a map, a diagram, a table or a picture.

In another embodiment of the present invention, when the touch pen 1030 is sensed on the note content item 1020 in the idle mode and sound of the video content item 1010 is not output from the video content item 1010 during reproduction of the video content item 1010, the display device 1000 may adjust the reproduction speed of the video content item 1010 to a higher speed.

Further, although not shown in the figure, the display device 1000 may indicate, on a progress-bar, a section in which the video content item 1010 is reproduced fast.

Referring to the third part of FIG. 10, when the display device 1000 senses the touch pen 1030 released from the idle mode, it may determine that the user has instructed that the automatic writing mode should be terminated.

More specifically, when the display device 1000 senses the touch pen 1030 released from the idle mode, the display device 1000 stops the process of scanning the content output from the video content item 1010 and copying the content onto the note content item 1020, and sense an input of the touch pen 1030 given by the user.

Further, in one embodiment of the present invention, the display device 1000 may indicate a section scanned in the automatic writing mode on the progress-bar 1040 of the video content item 1010.

Figure 11:
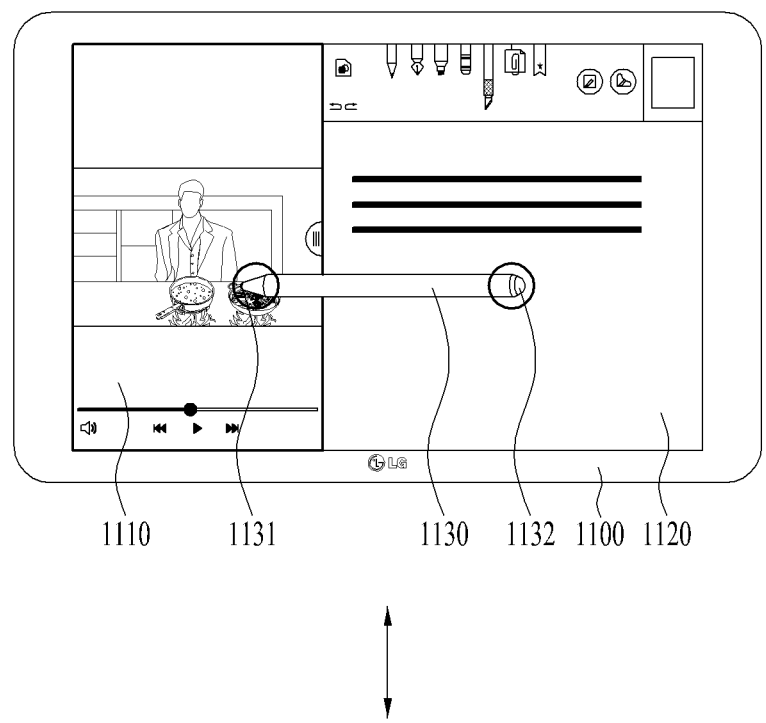
FIG. 11 is a view illustrating an embodiment in which the touchscreen is switched to an inactive mode according to an embodiment of the present invention.
Figure 11:
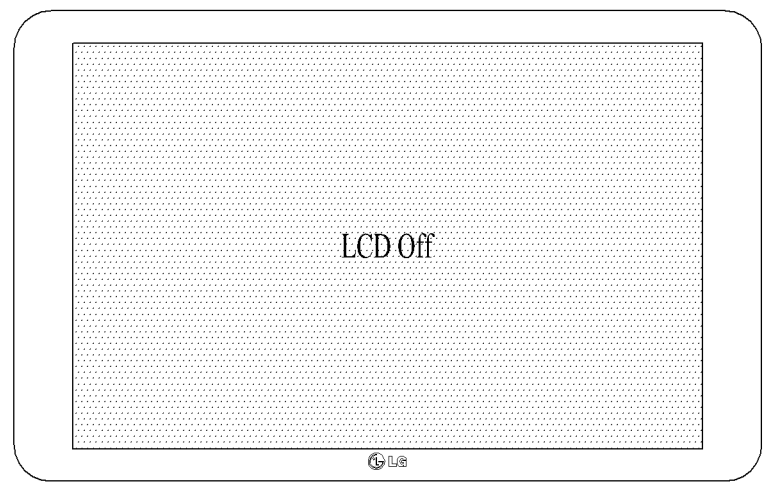

FIG. 11 is a view illustrating an embodiment in which the touchscreen is switched to an inactive mode according to an embodiment of the present invention. In the embodiment of FIG. 11, description of parts identical to those in FIGS. 5 to 10 will be omitted.

The first part of FIG. 11 illustrates a multitasking mode in which a video content item 1110 is executed in the left area of the touchscreen and a note content item 1120 is executed in the right area of the touchscreen as in the embodiment of FIG. 9. Here, the video content item 1110 may correspond to a state in which the video content item is being reproduced.

Referring to the first and second parts of FIG. 11, when the touch pen 1030 is sensed on the video content item 1110 and the note content item 1120 in the idle mode at the same time during reproduction of the video content item 1110, the display device 1100 may switch the touchscreen to the inactive mode. Here, the video content item 1110 may correspond to a state in which the reproduction is stopped.

More specifically, when the display device 1100 senses that the first tip 1131 of the touch pen 1130 in the left area of the touchscreen, in which the video content item 1110 is output, and the second tip 1132 in the right area of the touchscreen, in which the note content item 1120 is output, and also senses the touch pen 1130 being in the idle mode, it may switch the touchscreen to the inactive mode. That is, when the user places the touch pen 1130 across the video content 1110 and the note content item 1120, the display device 1100 may determine that the user has no intention to either view the video content 1110 or use the note content item 1120.

In addition, although not shown in the figure, even when the first tip 1131 is sensed on the note content item 1120 and the second pen tip 1132 is sensed on the video content item 1110 while the touch pen 1130 is in the idle mode, the display device 1100 may switch the touchscreen to the inactive mode as in the embodiment described above.

In addition, although not shown in the figure, when the display device 1100 senses the touch pen 1130 placed on the video content item 1110 and the note content item 1120 while the touch pen 1130 is in the idle mode, it may switch the touchscreen to the inactive mode after a preset time elapses. This is intended to prevent the display device 1100 from suddenly switching the touchscreen to the inactive mode when the user temporarily drops the touch pen 1130.

In one embodiment of the present invention, when the display device 1100 senses the touch pen 1130 moving after the touchscreen is switched to the inactive mode, the display device 1100 may switch the touchscreen to the active mode and resume reproducing the video content item 1110 where the video content item was stopped.

Figure 12:
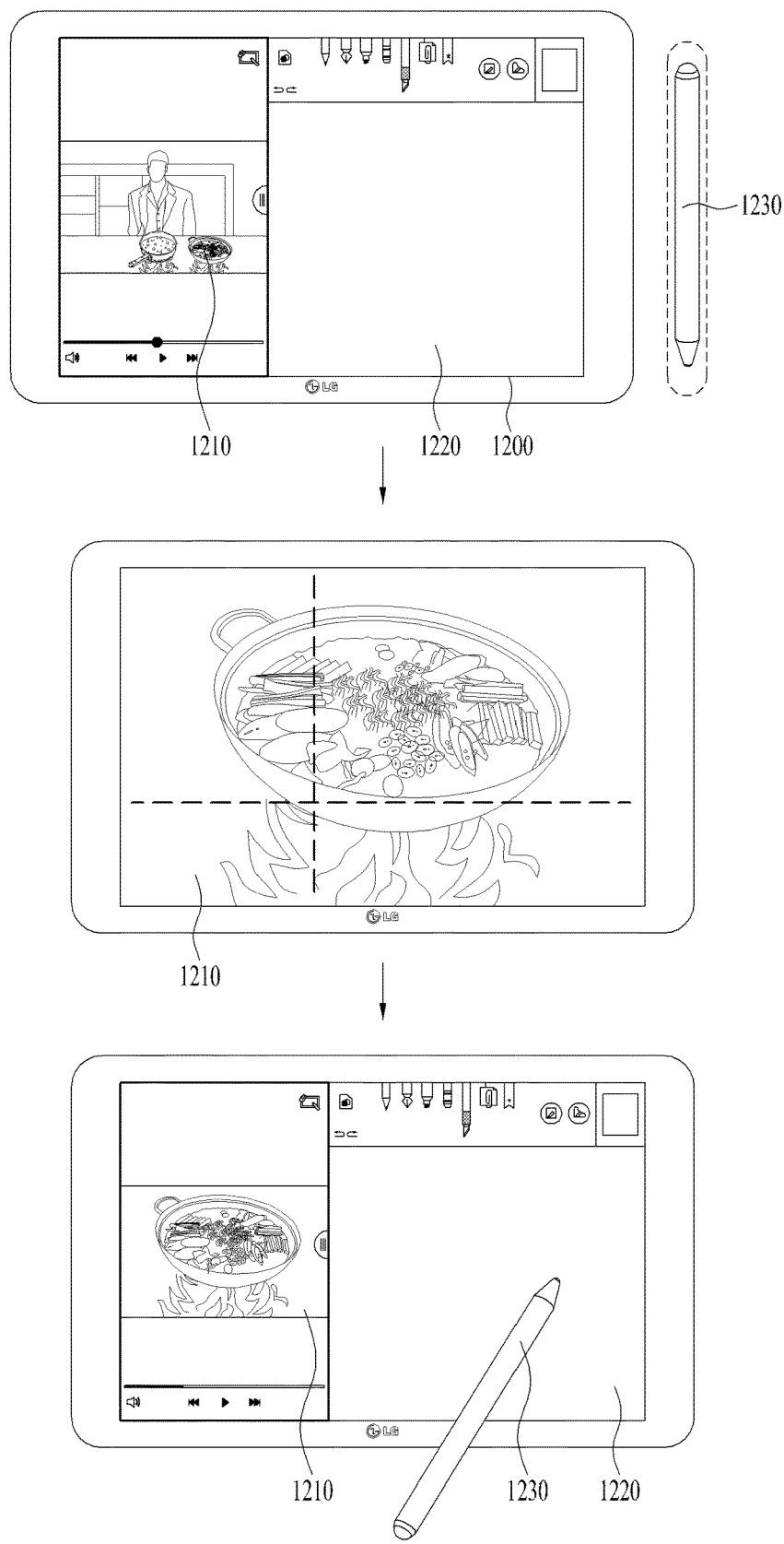
FIG. 12 is a view illustrating an embodiment in which a video content item is output in a full screen mode according to an embodiment of the present invention.

FIG. 12 is a view illustrating an embodiment in which a video content item is output in a full screen mode according to an embodiment of the present invention. In the embodiment of FIG. 12, description of parts identical to those in FIGS. 5 to 11 will be omitted.

The first part of FIG. 12 illustrates a multitasking mode in which a video content item 1210 is executed in the left area of the touchscreen and a note content item 1220 is executed in the right area of the touchscreen according to the embodiment of FIG. 9. Here, the video content item 1210 may correspond to a state in which the video content item is being reproduced.

Referring to the first and second parts of FIG. 12, when the touch pen 1230 is sensed in a preset hovering area of the display device 1200 for a preset time or longer during reproduction of the video content item 1210, the display device 1200 may terminate the multitasking mode and output the video content item 1210 on touchscreen in the full screen mode. Here, for the hovering area, refer to the description of FIG. 6 given above.

In one embodiment of the present invention, when the touch pen 1230 is sensed not moving for a preset time or longer in the hovering area, the display device 1200 may terminate the multitasking mode and output the video content item 1210 in the full screen mode. For example, when the user has laid down the touch pen 1230 for a predetermined time (e.g., 5 seconds) or longer, rather than leaving aside the touch pen 1230 for a while, the display device 1200 may output the video content item 1210 in the full screen mode.

That is, when the display device 1200 senses the user laying down the touch pen 1230 in the middle of viewing the video content 1210, it may determine that the user intends to solely view the video content item 1210 without taking a note on the note content item 1220.

In addition, although not shown in the figure, while the display device 1200 outputs the video content item 1210 in the full screen mode, the display device may sense whether the user is gazing at the video content item 1210, using a camera provided in the display device 1200.

Referring to the third part of FIG. 12, the display device 1200 may sense the touch pen 1230 moving while outputting the video content item 1210 in the full screen mode. When the display device 1200 senses the touch pen 1230 moving, the display device may stop outputting the video content item 1210 in the full screen mode and output the video content item 1210 and the note content item 1220 in the multitasking mode.

In this operation, when the display device 1200 senses the touch pen 1230 moving while the video content item 1210 is output in the full screen mode and the user gazes at the video content item 1210, it may output the note content item 1220 in the multitasking mode, keeping the reproduction of the note content item 1210 uninterrupted.

On the other hand, when the display device 1200 senses the touch pen 1230 moving while the video content item 1210 is output in the full screen mode and the user's gaze is not sensed, it may reproduce the video content item 1210 from the beginning again and execute the note content item 1220 and the multitasking mode.

Figure 13:
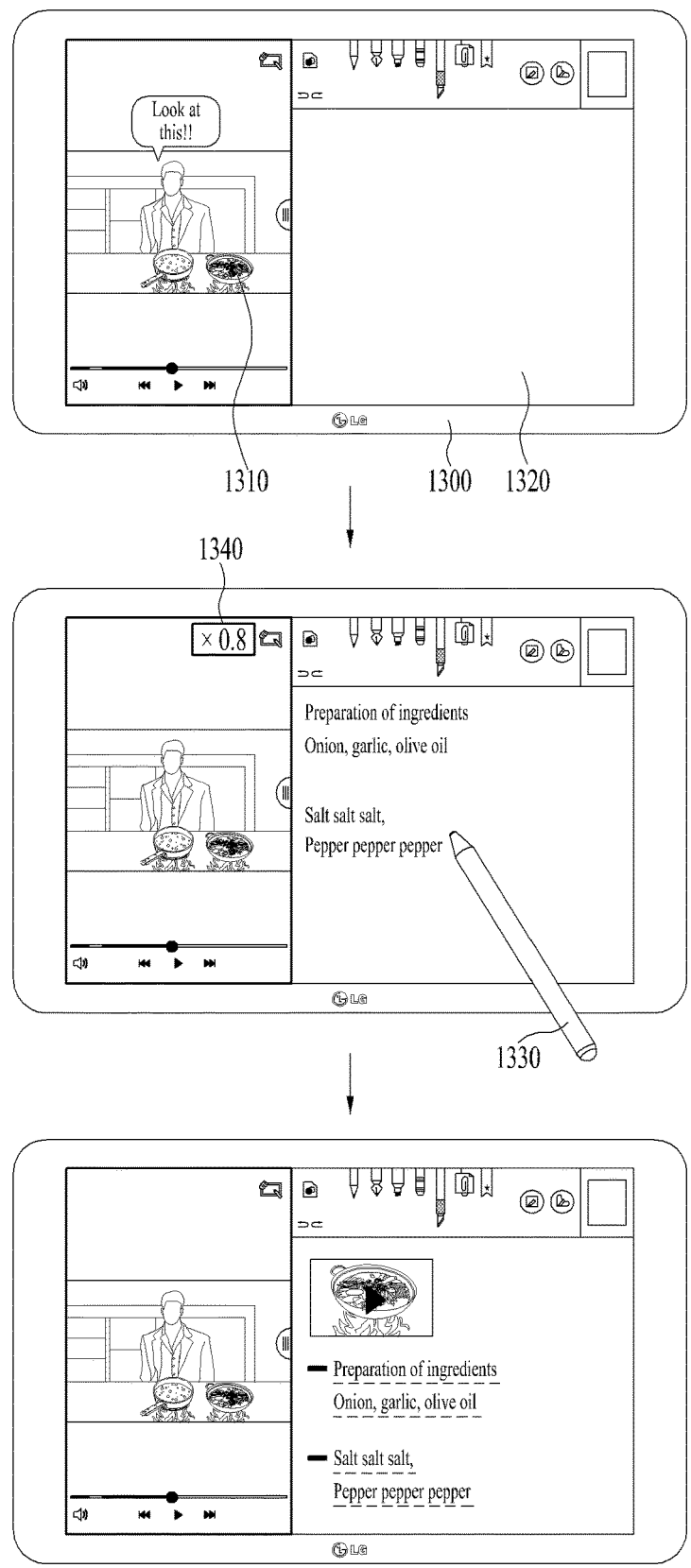
FIG. 13 is a view illustrating an example in which the reproduction speed of a video content item is adjusted according to an embodiment of the present invention.

FIG. 13 is a view illustrating an embodiment in which the reproduction speed of a video content item is adjusted according to an embodiment of the present invention. In the embodiment of FIG. 13, description of parts identical to those in FIGS. 5 to 12 will be omitted.

The first part of FIG. 13 illustrates a multitasking mode in which a video content item 1310 is executed in the left area of the touchscreen and a note content item 1320 is executed in the right area of the touchscreen as in FIG. 9. Here, the video content item 1310 may correspond to a state in which the video content item is being reproduced.

Referring to the first and second parts of FIG. 13, the display device 1300 may sense a specific word or sentence output during reproduction of the video content item 1310.

More specifically, the display device 1300 may sense a preset word or sentence output from the video content item 1310 while the video content item 1310 is being output on the touchscreen. Here, the preset word or sentence may correspond not only to a default word or sentence stored in the video content item 1310, but also to a word or sentence set by the user.

Referring to the second part of FIG. 13, when the display device 1300 senses the preset word or sentence output from the video content item 1310, it may adjust the reproduction speed of the video content item 1310 to a lower speed.

For example, when the video content item 1310 is an educational lecture and the display device 1300 senses a word or sentence such as "Concentrate," "Mark a star," or "Listen carefully" output from the video content item 1310, the display device may adjust the reproduction speed of the video content item 1310 to a lower speed. When the video content item 1310 is a cooking lecture and the display device 1300 senses a word or sentence such as "Be careful" or "Ingredients" output from the video content item 1310, the display device may adjust the reproduction speed of the video content item 1310 to a lower speed.

That is, the display device 1300 may sense a preset word or sentence based on the type of the video content item 1310 that is executed, while not having any information on the user's writing habits. In addition, a pre-developed learning platform such as deep mind may be applied to this operation.

In one embodiment of the present invention, when the display device 1300 adjusts the reproducing speed of the video content item 1310 to a lower speed, the display device may output an indicator 1340 indicating magnification of the reproduction speed of the video content on the video content item 1310. For example, when a specific word is sensed from the video content item 1310, the display device 1300 may adjust the reproduction speed of the video content item 1310 to a 0.8 times speed. Thus, the display device 1300 may output "X 0.8" on the video content item 1310 as the indicator 1340. In addition, the slow speed at which the video content item 1310 is reproduced may be a default value specified in the video content item 1310 or a value set by the user.

Referring to the third part of FIG. 13, if any input is not sensed from the touch pen 1330 for a preset time after the reproduction speed of the video content item 1310 is adjusted to a lower speed, the display device 1300 may adjust the reproduction speed of the video content item 1310 to the original speed.

Figure 14:
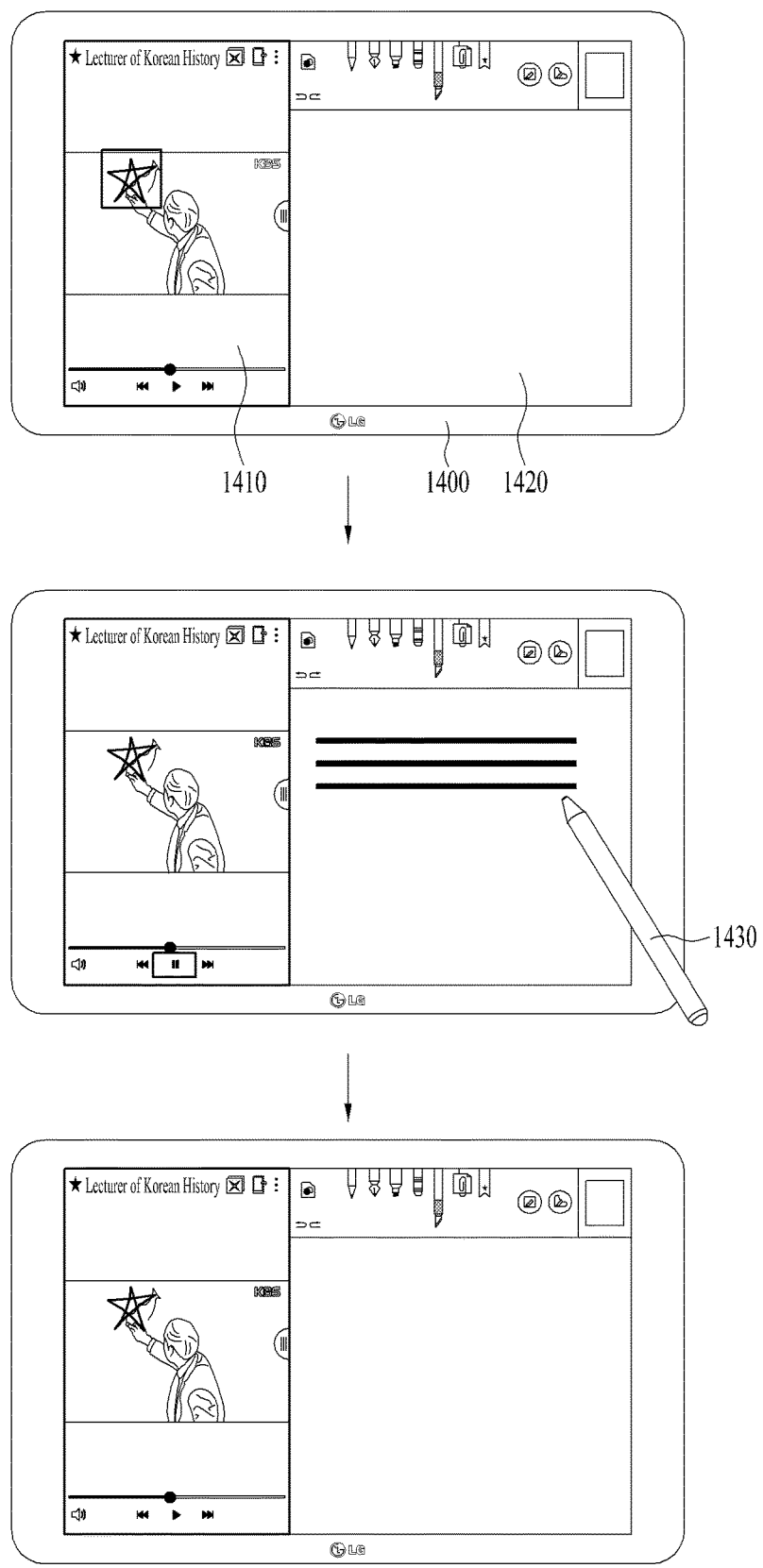
FIG. 14 is a view illustrating another example in which the reproduction speed of a video content item is adjusted according to an embodiment of the present invention.

FIG. 14 is a view illustrating another example in which the reproduction speed of a video content item is adjusted according to an embodiment of the present invention. In the embodiment of FIG. 14, description of parts identical to those in FIGS. 5 to 13 will be omitted.

The first part of FIG. 14 illustrates a multitasking mode in which a video content item 1410 is executed in the left area of the touchscreen and a note content item 1420 is executed in the right area of the touchscreen as in FIG. 9. Here, the video content item 1410 may correspond to a state in which the video content item is being reproduced.

Referring to the first and second parts of FIG. 14, the display device 1400 may sense a specific picture or view output during reproduction of the video content item 1410.

More specifically, the display device 1400 may sense a preset image output from the video content item 1410 while the video content item 1410 is being output on the touchscreen. Here, the preset image may correspond not only to a default image (e.g., a picture or view) stored in the video content item 1310, but also to an image set by the user.

In one embodiment of the present invention, the display device 1400 may stop reproducing the video content item 1410 when it senses the preset image output on the video content item 1410.

For example, in the case where the video content item 1410 is an educational lecture, the display device 1400 may stop reproducing the video content item 1410 when it senses an image of a star mark output from the video content item 1410.

Referring to the third part of FIG. 14, if any input is not sensed from the touch pen 1430 for a preset time after the reproduction of the video content item 1410 is stopped, the display device 1400 may resume reproducing the video content item 1410.

That is, when an image determined to be important is output in the video content item 1410, the display device 1400 may stop reproducing the video content item 1410 to allow the user to take notes. If a preset time passes without the user taking anything down on the note content item 1420, the display device may resume reproducing the video content item 1410.

OTHER EMBODIMENTS

The display device may perform other functions based on the active content item. For example, when the active content item is video content, the display device may store a section of the video content in the note content item. When the active content item is music reproduction content, the display device may output music paper as a template of the note content item. When the active content item is content including an image, the display device may output a coloring book image as a template of the note content item. Hereinafter, the above-mentioned examples will be described with reference to FIGS. 15 to 17.

Figure 15:
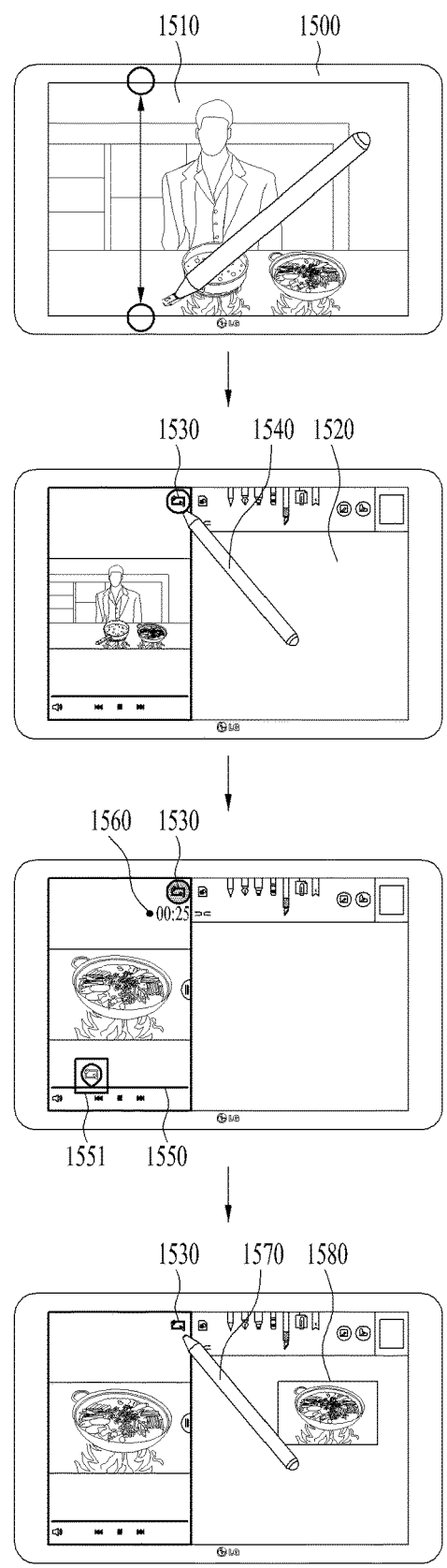
FIG. 15 is a view illustrating an example of utilizing a note content item in a multitasking mode according to an embodiment of the present invention.

FIG. 15 is a view illustrating an example of utilizing a note content item in a multitasking mode according to an embodiment of the present invention. In the embodiment of FIG. 15, description of parts identical to those in FIGS. 5 to 14 will be omitted.

The first part of FIG. 15 may correspond to the first part of FIG. 7. In one embodiment of the present invention, when the display device 1500 senses, from the touch pen, an input signal for controlling the multitasking mode so as to be executed while a video content item 1510 is active on the touchscreen, the display device may execute a note content item 1520 in the right area of the touchscreen.

Referring to the second part of FIG. 15, the display device 1500 may output a section scrap button 1530 on the video content item 1510 in an overlaying manner after the display device is switched to the writing mode.

Referring to the third part of FIG. 15, when the display device 1500 senses a first input signal 1540 for selecting the section scrap button 1530, the display device may cut a partial section of the video content item 1510 and store the same in the note content item 1520.

More specifically, while the video content item 1510 is being reproduced, the display device 1500 may cut a scrap of video data from a first point of time at which the first input signal 1540 for selecting the section scrap button 1530 is sensed.

The display device 1500 may indicate a scrap section 1551 on a progress bar 1550 of the video content item 1510 while a scrap of the video content item 1510 is being cut. For example, the display device 1500 may output the scrap section 1551 in a different color on the progress bar 1550 of the video content item 1510. The display device 1500 may output the scrap time indicator 1560 at the lower end of the section scrap button 1530 while the scrap of the video content item 1510 is being cut.

Referring to the fourth FIG. 15, when the display device 1500 senses a second input signal 1570 for selecting the section scrap button 1530 again while a scrap of the video content item 1510 is being cut, the display device may terminate cutting the scrap of the video content item 1510.

More specifically, the display device 1500 may cut a scrap of video from a first point of time when the first input signal 1540 is sensed to a second point of time when the second input signal 1570 is sensed, and store the same in the note content item 1520.

In one embodiment of the present invention, the display device 1500 may output the partial scrap section of the video content item 1510 as a thumbnail 1580 and attach the same to the note content item 1520. Here, the thumbnail 1580 may be a still image representing the partial scrap section of the video content item 1510. The thumbnail 1580 may be one of a still image at a first point of time, a still image at a second point of time, and a still image cut between the first point of time and the second point of time.

In addition, although not shown in the figure, when the display device 1500 senses a third input signal for selecting the thumbnail 1580 of the scrap section, the display device may reproduce a video clip of the scrap section.

Figure 16:
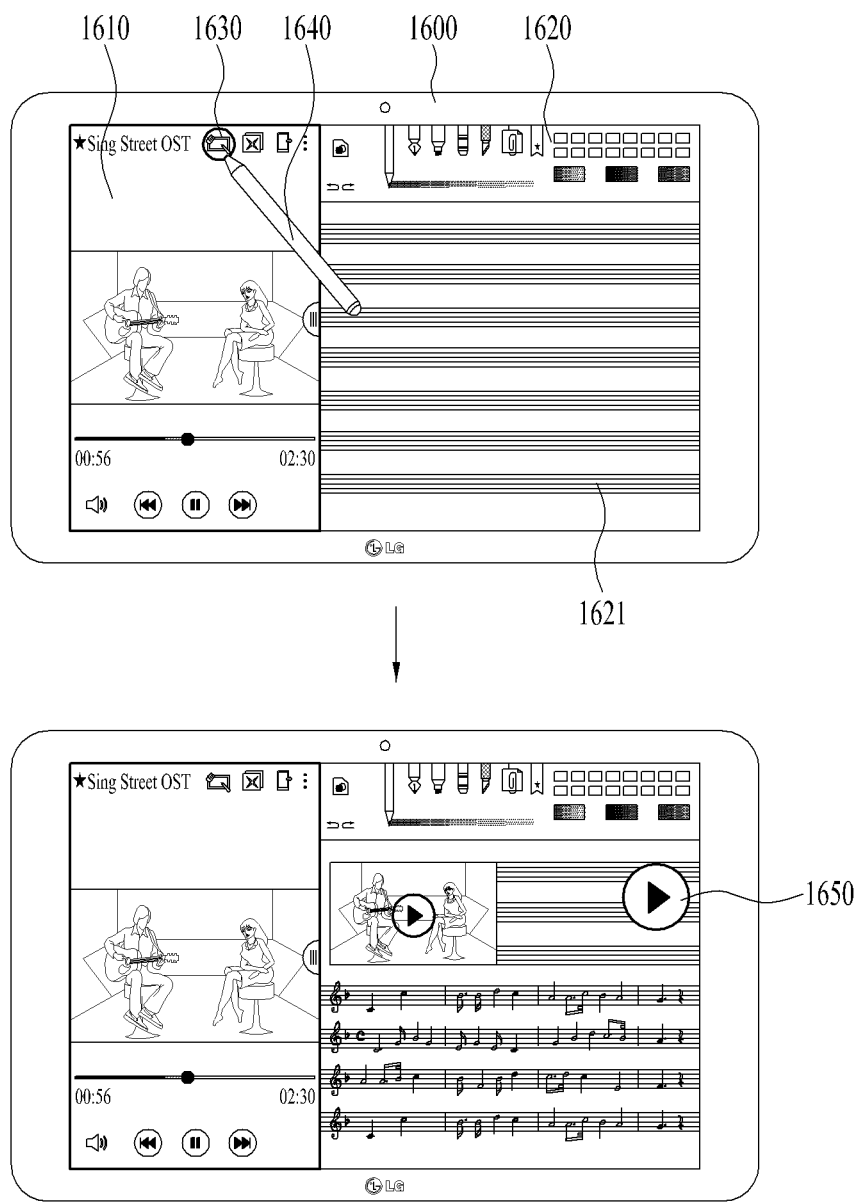
FIG. 16 is a view illustrating an example in which a template of a note content item is changed depending on an active content item according to an embodiment of the present invention.

FIG. 16 is a view illustrating an embodiment in which a template of a note content item is changed depending on an active content item according to an embodiment of the present invention. In the embodiment of FIG. 16, description of parts identical to those in FIGS. 5 to 15 will be omitted.

Referring to the first part of FIG. 16, the display device 1600 may determine a content item being active on the touchscreen. Here, the determined content item may correspond to a music reproduction content item 1610. When the multitasking mode is executed while the music reproduction content item 1610 is active, the display device 1600 may execute a note content item 1620 in the right area of the touchscreen.

In one embodiment of the present invention, when the determined active content item is the music reproduction content item 1610, the display device 1600 may output music paper 1621 as a template of the note content item 1620. That is, the display device 1600 may output a different template of the note content item 1620 based on the kind of the active content item.

Referring to the second part of FIG. 16, when display device 1600 senses a first input signal 1640 for selecting a section scrap button 1630, the display device may output a score corresponding to a partial section of the music reproduction content item 1610 on the music paper 1621. In addition, since the embodiment of FIG. 15 can be applied to the embodiment of FIG. 16, the scrap section may be indicated on the progress bar according to the first input signal 1640 for selecting the section scrap button 1630 and may also be attached on the note content item 1620.

In one embodiment of the present invention, when the display device 1600 senses a second input signal for selecting a score reproduction button 1650, the output score may be automatically reproduced. In addition, although not shown in the figure, when the display device 1600 senses a third input signal for selecting a score edit button, the output score may be automatically allowed to be edited.

Figure 17:
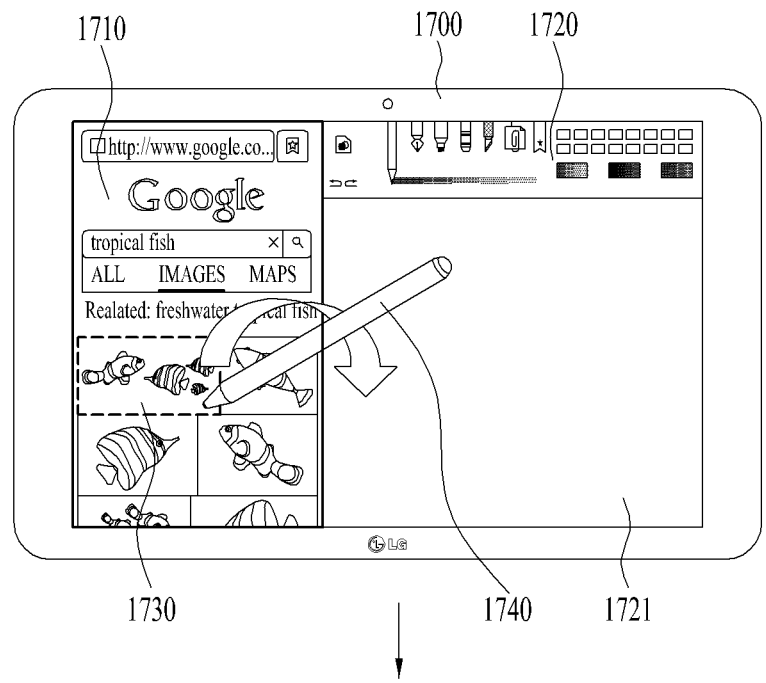
FIG. 17 is a view illustrating another example in which the template of the note content item is changed depending on an active content item according to an embodiment of the present invention.
Figure 17:
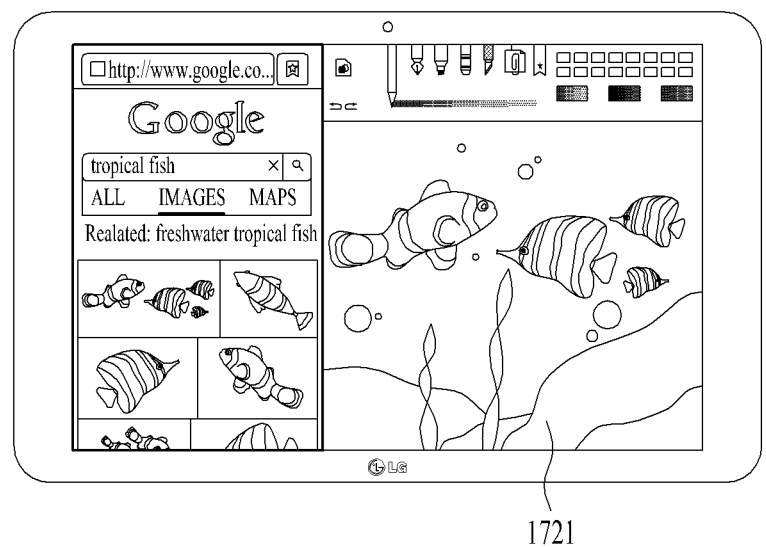

FIG. 17 is a view illustrating another example in which the template of the note content item is changed depending on an active content item according to an embodiment of the present invention. In the embodiment of FIG. 17, description of parts identical to those in FIGS. 5 to 16 will be omitted.

Referring to the first part of FIG. 17, the display device 1700 may determine a content item being active on the touchscreen. Here, the determined content item may correspond to a content item 1710 including an image. For example, the content item 1710 including an image may include a web browser including an image search function, a gallery application including an image, and a video content item including a still image. In addition, when the multitasking mode is executed while the content item 1710 including an image is active, the display device 1700 may execute a note content item 1720 in the right area of the touchscreen.

Referring to the second part of FIG. 17, the display device 1700 may sense a first input signal 1740 for touch-dragging an image 1730 output on the content item 1710 to the note content item 1720 while the multitasking mode is being executed.

In one embodiment of the present invention, as the display device 1700 senses the first input signal 1740, it may output a coloring book template 1721 as a template of the note content item 1720. Here, the coloring book template 1721 may correspond to a template of an outline and a pattern output by automatically scanning the touch-dragged image 1730.

Thereafter, although not shown in the figure, the display device 1700 may fill the output coloring book template 1721 with different colors and output the coloring book template 1721 according to a user command.

Figure 18:
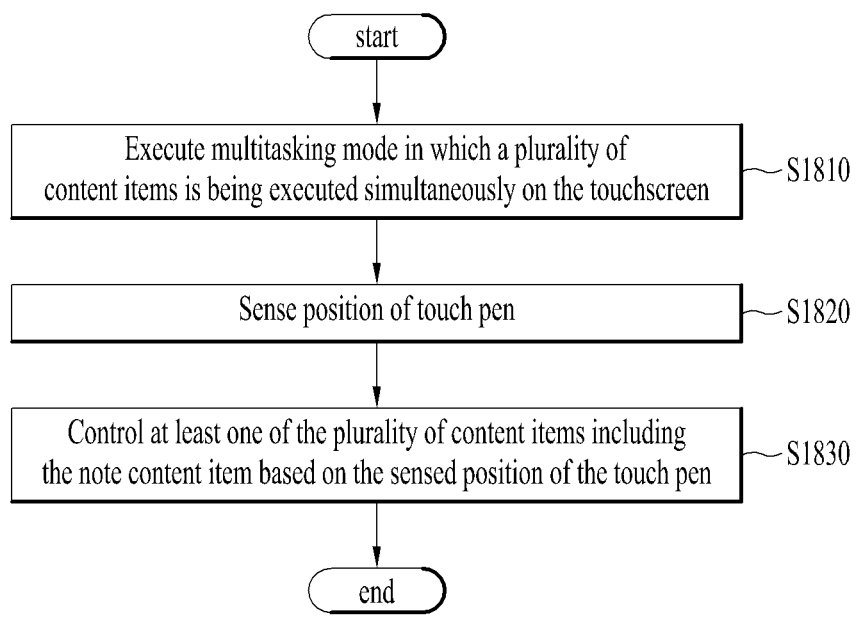
FIG. 18 is a flowchart illustrating an example in which at least one of a plurality of content items is controlled based on the position of the touch pen according to an embodiment of the present invention.

FIG. 18 is a flowchart illustrating an example in which at least one of a plurality of content items is controlled according to the position of the touch pen according to an embodiment of the present invention. Each step in FIG. 18, which will be described below, may be controlled by the controller of FIG. 1A.

In step S1810, the display device may execute a multitasking mode. Here, the multitasking mode may correspond to a mode in which a plurality of content items is being executed concurrently on the touchscreen.

In one embodiment of the present invention, the display device may concurrently output a first content item and a note content item on the touchscreen. Here, the display device may output the first content item in a first area of the touchscreen and the note content item in a second area of the touchscreen.

In one embodiment of the present invention, the positions of the first area and the second area may be determined according to the sensed position of the touch pen.

In step S1820, the display device may sense the position of the touch pen while the multitasking mode is executed.

In one embodiment of the present invention, while the multitasking mode is executed, the display device may sense whether the touch pen is positioned over an area where the first content item is output and whether the touch pen is positioned over an area where the note content item is output.

In one embodiment of the present invention, the display device may distinguishably sense a first pen tip located at a lower portion of the touch pen and a second pen tip located at an upper portion of the touch pen. If the distance from the top of the touchscreen to the first pen tip of the touch pen and the distance from the top of the touchscreen to the second pen tip are equal to each other or the difference therebetween is within a preset range, the display device may define that the touch pen is in the idle mode.

In step S1830, the display device may control at least one of the plurality of content items based on the sensed position of the touch pen.

In one embodiment of the present invention, the display device may control at least one of the first content item and the note content item differently depending on whether the touch pen in the idle mode is sensed on the first content item, the note content item, or the hovering area of the display device.

Of course, the embodiments described above with reference to FIGS. 7 to 17 may be implemented as a control method for a mobile terminal as shown in FIG. 18.

The abovementioned present disclosure may be implemented using computer readable codes on a medium on which a program is recorded. The computer readable medium includes any type of recording device that stores data that may be read by a computer system. Examples of the medium that can be read by a computer include HDD (Hard Disk Drive), SSD (Solid State Disk), SDD (Silicon Disk Drive), ROM, RAM, CD-ROM, magnetic tape, floppy disk, optical data storage device, etc. Further, the medium may include a carrier wave (for example, transmission over the Internet). Further, the computer may include a controller 180 of the mobile terminal. Accordingly, the above detailed description is to be considered in all respects as illustrative and not restrictive. The scope of the present disclosure shall be determined by a rational interpretation of the appended claims. All changes within the equivalent range of the present disclosure are included in the scope of the present disclosure.

INDUSTRIAL APPLICABILITY

The present invention has industrial applicability to the mobile terminal and thus is applicable repeatedly.

The invention claimed is:

1. A display device comprising:
a sensing unit configured to sense a touch pen;
a touchscreen; and
a controller configured to:
in a multitasking mode concurrently executing a plurality of content items on the touchscreen control at least one of the plurality of content items based on a position of the touch pen, the plurality of content items comprising a note content item,
wherein the controller is further configured to:
sense positions of a first pen tip and a second pen tip of the touch pen through the sensing unit, and
while the note content item and a first content item are executed in the multitasking mode, perform a control operation to output the note content item in a first area of the touchscreen and the first content item in a second area of the touchscreen, and
wherein sizes of the first area and the second area are determined based on the sensed position of the first pen tip of the touch pen, and positions of the first area and the second area are determined based on the sensed positions of the first pen tip and the second pen tip of the touch pen,
wherein the controller is further configured to:
determine a content item being active on the touchscreen, and
execute the multitasking mode based on the determined content item and a first input signal of the touch pen, wherein the active content item is a video content item being reproduced, and
wherein the controller is further configured to:
stop reproducing the video content item when the controller senses a preset image output on the video content item.

2. The display device of claim 1, wherein the first input signal is an input signal of a touch-drag from a first point to a second point in a bezel portion of the display device.

3. The display device of claim 1, wherein the controller is configured to determine that the touch pen is in an idle mode, when it is sensed that a vertical distance from a top of the touchscreen to the first pen tip is equal to a vertical distance from the top of the touchscreen to the second pen tip.

4. The display device of claim 3, wherein the controller is configured to stop reproducing the video content item as the touch pen is sensed on the video content item in the idle mode.

5. The display device of claim 3, wherein the controller is further configured to scan an image of the video content item being reproduced and output the scanned image on the note content item, when the touch pen is sensed on the note content item in the idle mode.

6. The display device of claim 5, wherein the controller is configured to store a reproduction point of time of the video content item being reproduced to be mapped to the image of the video content time, when the image of the video content item is scanned and output on the note content item.

7. The display device of claim 3, wherein the controller is configured to switch the touchscreen to an inactive mode when the touch pen is sensed on the video content item and the note content item in the idle mode at the same time.

8. The display device of claim 3, wherein the controller is configured to terminate the multitasking mode and output the video content item on the touchscreen in a full screen mode, when the touch pen is sensed in a preset hovering area of the display device for a preset time or longer.

9. The display device of claim 1, wherein the controller is configured to adjust a reproduction speed of the video content item to a lower speed when the controller senses preset sound output on the video content item.

10. The display device of claim 1, wherein the controller is configured to adjust a reproduction speed of the video content item to a higher speed when no sound is output on the video content item.

11. The display device of claim 1, wherein the controller is configured to output an indicator for changing positions of the first area and the second area.

12. The display device of claim 1, wherein the controller is configured to change a template of the note content item according to the determined active content.

13. The display device of claim 1, wherein paper feel coating is applied to one area of a top of the touchscreen.

14. A method for controlling a display device, the method comprising:
executing, via a controller of the display device, a multitasking mode in which a plurality of content items are concurrently executed on a touchscreen;
sensing, via a sensing unit of the display device, a position of a touch pen; and
controlling, via the controller, at least one of the plurality of content items based on the position of the touch pen,
wherein the plurality of content items comprise a note content item,
wherein the method further comprises:

sensing positions of a first pen tip and a second pen tip of the touch pen; and while the note content item and a first content item are executed in the multitasking mode, performing a control operation to output the note content item in a first area of the touchscreen and the first content item in a second area of the touchscreen, and wherein sizes of the first area and the second area are determined based on the sensed position of the first pen tip of the touch pen, and positions of the first area and the second area are determined based on the sensed positions of the first pen tip and the second pen tip of the touch pen, wherein the method further comprises:

determining a content item being active on the touchscreen, and executing the multitasking mode based on the determined content item and a first input signal of the touch pen, wherein the active content item is a video content item being reproduced, and wherein the method further comprises:

stopping reproducing the video content item when the controller senses a preset image output on the video content item.

\* \* \* \* \*